United States Patent
Snow et al.

(10) Patent No.: US 11,580,534 B2
(45) Date of Patent: *Feb. 14, 2023

(54) AUDITING OF ELECTRONIC DOCUMENTS

(71) Applicant: Inveniam Capital Partners, Inc., New York, NY (US)

(72) Inventors: Paul Snow, Austin, TX (US); Jason Nadeau, Missouri City, TX (US); Mahesh Paolini-Subramanya, Austin, TX (US); Brian Deery, Austin, TX (US)

(73) Assignee: Inveniam Capital Partners, Inc., New York, NY (US)

(*) Notice: Subject to any disclaimer, the term of this patent is extended or adjusted under 35 U.S.C. 154(b) by 102 days.

This patent is subject to a terminal disclaimer.

(21) Appl. No.: 16/905,945

(22) Filed: Jun. 19, 2020

(65) Prior Publication Data

US 2020/0320620 A1 Oct. 8, 2020

Related U.S. Application Data

(62) Division of application No. 15/465,702, filed on Mar. 22, 2017, now Pat. No. 10,817,873.

(51) Int. Cl.
*G06Q 20/38* (2012.01)
*G06Q 40/02* (2012.01)
(Continued)

(52) U.S. Cl.
CPC ......... *G06Q 20/382* (2013.01); *G06Q 40/025* (2013.01); *G06Q 50/16* (2013.01);
(Continued)

(58) Field of Classification Search
CPC .... G06Q 20/382; G06Q 40/025; G06Q 50/16; G06Q 50/18; G06Q 2220/00; H04L 9/3239; H04L 9/50
See application file for complete search history.

(56) References Cited

U.S. PATENT DOCUMENTS

| 4,309,569 A | 6/1982 | Merkel |
| 5,499,294 A | 3/1996 | Friedman |

(Continued)

FOREIGN PATENT DOCUMENTS

| CN | 110392052 A | 10/2019 |
| CN | 110599147 A | 12/2019 |

(Continued)

OTHER PUBLICATIONS

Sokolowski, R. (2011). Signed, sealed, delivered: EMortgages are protected from unauthorized alteration by something called a tamper seal. Mortgage Banking, 71(6), 108(4). Retrieved from https://dialog.proquest.com/professional/docview/1068158815?accountid=131444 (Year: 2011).*

(Continued)

*Primary Examiner* — John W Hayes
*Assistant Examiner* — Taylor S Rak
(74) *Attorney, Agent, or Firm* — Koffsky Schwalb LLC

(57) ABSTRACT

Auditing of mortgage documents is faster and simpler. An electronic mortgage application often contains or references a collection of many separate electronic mortgage documents. Electronic data representing an original version of an electronic mortgage document and its current version may be hashed to generate digital signatures. Any auditor may then quickly compare the digital signatures. If the digital signatures match, then the audit reveals that the electronic mortgage document has not changed since its creation. However, if the digital signatures do not match, then the electronic mortgage document has changed since its creation. The auditor may thus flag the electronic mortgage document for additional auditing processes.

20 Claims, 27 Drawing Sheets

(51) Int. Cl.
  *G06Q 50/18* (2012.01)
  *G06Q 50/16* (2012.01)
  *H04L 9/00* (2022.01)
  *H04L 9/32* (2006.01)

(52) U.S. Cl.
  CPC .......... *G06Q 50/18* (2013.01); *H04L 9/3239* (2013.01); *H04L 9/50* (2022.05); *G06Q 2220/00* (2013.01)

(56) References Cited

U.S. PATENT DOCUMENTS

| | | | |
|---|---|---|---|
| 5,606,609 A * | 2/1997 | Houser | H04L 9/3236 |
| | | | 715/209 |
| 5,862,218 A | 1/1999 | Steinberg | |
| 5,920,629 A | 7/1999 | Rosen | |
| 5,966,446 A | 10/1999 | Davis | |
| 6,363,481 B1 | 3/2002 | Hardjono | |
| 7,028,263 B2 | 4/2006 | Maguire | |
| 7,212,808 B2 | 5/2007 | Engstrom | |
| 7,272,179 B2 | 9/2007 | Siemens et al. | |
| 7,572,179 B2 | 8/2009 | Choi et al. | |
| 7,729,950 B2 | 6/2010 | Mendizabal et al. | |
| 7,730,113 B1 * | 6/2010 | Payette | G06Q 10/00 |
| | | | 709/224 |
| 8,245,038 B2 | 8/2012 | Golle et al. | |
| 8,266,439 B2 | 9/2012 | Haber et al. | |
| 8,359,361 B2 | 1/2013 | Thornton | |
| 8,442,903 B2 | 5/2013 | Zadoorian et al. | |
| 8,560,722 B2 | 10/2013 | Gates et al. | |
| 8,612,477 B2 | 12/2013 | Becker | |
| 8,706,616 B1 | 4/2014 | Flynn | |
| 8,712,887 B2 | 4/2014 | DeGroeve et al. | |
| 8,867,741 B2 | 10/2014 | McCorkindale et al. | |
| 8,943,332 B2 | 1/2015 | Horne et al. | |
| 8,990,322 B2 | 3/2015 | Cai | |
| 9,124,423 B2 | 9/2015 | Jennas, II et al. | |
| 9,378,343 B1 | 6/2016 | David | |
| 9,396,006 B2 | 7/2016 | Kundu et al. | |
| 9,398,018 B2 | 7/2016 | Macgregor | |
| 9,407,431 B2 | 8/2016 | Bellare et al. | |
| 9,411,524 B2 | 8/2016 | O'Hare et al. | |
| 9,411,976 B2 | 8/2016 | Irvine | |
| 9,411,982 B1 | 8/2016 | Dippenaar et al. | |
| 9,424,576 B2 | 8/2016 | Vandervort | |
| 9,436,923 B1 | 9/2016 | Sriram | |
| 9,436,935 B2 | 9/2016 | Hudon | |
| 9,472,069 B2 | 10/2016 | Roskowski | |
| 9,489,827 B2 | 11/2016 | Quinn et al. | |
| 9,584,493 B1 | 2/2017 | Leavy | |
| 9,588,790 B1 | 3/2017 | Wagner | |
| 9,647,977 B2 | 5/2017 | Levasseur | |
| 9,722,790 B2 | 8/2017 | Ebrahimi | |
| 9,818,109 B2 | 11/2017 | Loh | |
| 9,830,580 B2 | 11/2017 | Macgregor | |
| 9,875,510 B1 | 1/2018 | Kasper | |
| 9,876,646 B2 | 1/2018 | Ebrahimi | |
| 9,882,918 B1 | 1/2018 | Ford et al. | |
| 10,025,941 B1 | 7/2018 | Griffin | |
| 10,046,228 B2 | 8/2018 | Tran | |
| 10,102,265 B1 | 10/2018 | Madisetti | |
| 10,102,526 B1 | 10/2018 | Madisetti | |
| 10,108,954 B2 | 10/2018 | Dunlevy | |
| 10,135,607 B1 | 11/2018 | Roets | |
| 10,163,080 B2 | 12/2018 | Chow | |
| 10,270,599 B2 | 4/2019 | Nadeau | |
| 10,346,815 B2 | 7/2019 | Glover | |
| 10,366,204 B2 | 7/2019 | Tanner, Jr. | |
| 10,373,129 B1 | 8/2019 | James | |
| 10,411,897 B2 | 9/2019 | Paolini-Subramanya | |
| 10,419,225 B2 | 9/2019 | Deery | |
| 10,476,847 B1 | 11/2019 | Smith | |
| 10,532,268 B2 | 1/2020 | Tran | |
| 10,586,270 B2 | 3/2020 | Reddy | |
| 10,628,268 B1 | 4/2020 | Baruch | |
| 10,685,399 B2 | 6/2020 | Snow | |
| 10,693,652 B2 | 6/2020 | Nadeau | |
| 10,749,848 B2 | 8/2020 | Voell | |
| 10,764,752 B1 | 9/2020 | Avetisov | |
| 10,783,164 B2 | 9/2020 | Snow | |
| 10,817,873 B2 | 10/2020 | Paolini-Subramanya | |
| 10,826,685 B1 | 11/2020 | Campagna | |
| 10,855,446 B2 | 12/2020 | Ow | |
| 10,873,457 B1 | 12/2020 | Beaudoin | |
| 10,929,842 B1 | 2/2021 | Arvanaghi | |
| 10,949,926 B1 | 3/2021 | Call | |
| 10,958,418 B2 | 3/2021 | Ajoy | |
| 10,997,159 B2 | 5/2021 | Iwama | |
| 11,042,871 B2 | 6/2021 | Snow | |
| 11,044,095 B2 | 6/2021 | Lynde | |
| 11,044,097 B2 | 6/2021 | Snow | |
| 11,044,100 B2 | 6/2021 | Deery | |
| 11,063,770 B1 | 7/2021 | Peng | |
| 11,093,933 B1 | 8/2021 | Peng | |
| 11,134,120 B2 | 9/2021 | Snow | |
| 11,164,250 B2 | 11/2021 | Snow | |
| 11,170,366 B2 | 11/2021 | Snow | |
| 11,205,172 B2 | 12/2021 | Snow | |
| 11,276,056 B2 | 3/2022 | Snow | |
| 11,295,296 B2 | 4/2022 | Snow | |
| 11,296,889 B2 | 4/2022 | Snow | |
| 11,328,290 B2 | 5/2022 | Snow | |
| 11,334,874 B2 | 5/2022 | Snow | |
| 11,347,769 B2 | 5/2022 | Snow | |
| 11,348,097 B2 | 5/2022 | Snow | |
| 11,348,098 B2 | 5/2022 | Snow | |
| 2001/0029482 A1 | 10/2001 | Tealdi | |
| 2003/0018563 A1 | 1/2003 | Kilgour et al. | |
| 2004/0085445 A1 | 5/2004 | Park | |
| 2005/0206741 A1 | 9/2005 | Raber | |
| 2006/0075228 A1 | 4/2006 | Black et al. | |
| 2006/0184443 A1 | 8/2006 | Erez et al. | |
| 2007/0027787 A1 | 2/2007 | Tripp | |
| 2007/0094272 A1 | 4/2007 | Yeh | |
| 2007/0174630 A1 | 7/2007 | Shannon | |
| 2007/0296817 A1 | 12/2007 | Ebrahimi et al. | |
| 2008/0010466 A1 | 1/2008 | Hopper | |
| 2008/0028439 A1 | 1/2008 | Shevade | |
| 2008/0059726 A1 | 3/2008 | Rozas | |
| 2009/0025063 A1 | 1/2009 | Thomas | |
| 2009/0287597 A1 | 11/2009 | Bahar | |
| 2010/0049966 A1 | 2/2010 | Kato | |
| 2010/0058476 A1 | 3/2010 | Isoda | |
| 2010/0161459 A1 | 6/2010 | Kass et al. | |
| 2010/0228798 A1 | 9/2010 | Kodama | |
| 2010/0241537 A1 | 9/2010 | Kass et al. | |
| 2011/0061092 A1 | 3/2011 | Bailloeul | |
| 2011/0161674 A1 | 6/2011 | Ming | |
| 2012/0203670 A1 | 8/2012 | Piersol | |
| 2012/0264520 A1 | 10/2012 | Marsland | |
| 2013/0142323 A1 | 6/2013 | Chiarella | |
| 2013/0222587 A1 | 8/2013 | Roskowski | |
| 2013/0275765 A1 * | 10/2013 | Lay | G06F 21/6218 |
| | | | 713/189 |
| 2013/0276058 A1 | 10/2013 | Buldas | |
| 2014/0022973 A1 | 1/2014 | Kopikare | |
| 2014/0201541 A1 | 7/2014 | Paul | |
| 2014/0229738 A1 | 8/2014 | Sato | |
| 2014/0282852 A1 | 9/2014 | Vestevich | |
| 2014/0289802 A1 | 9/2014 | Lee | |
| 2014/0297447 A1 | 10/2014 | O'Brien | |
| 2014/0344015 A1 | 11/2014 | Puertolas-Montasnes et al. | |
| 2015/0193633 A1 | 7/2015 | Chida | |
| 2015/0206106 A1 | 7/2015 | Yago | |
| 2015/0242835 A1 | 8/2015 | Vaughan | |
| 2015/0244729 A1 | 8/2015 | Mao | |
| 2015/0309831 A1 | 10/2015 | Powers | |
| 2015/0332256 A1 | 11/2015 | Minor | |
| 2015/0363769 A1 | 12/2015 | Ronca | |
| 2015/0378627 A1 | 12/2015 | Kitazawa | |
| 2015/0379484 A1 | 12/2015 | McCarthy | |
| 2016/0002923 A1 | 1/2016 | Alobily | |
| 2016/0012240 A1 * | 1/2016 | Smith | G06F 21/604 |
| | | | 726/1 |

(56) References Cited

U.S. PATENT DOCUMENTS

| | | |
|---|---|---|
| 2016/0021743 A1 | 1/2016 | Pai |
| 2016/0071096 A1 | 3/2016 | Rosca |
| 2016/0098578 A1 | 4/2016 | Hincker |
| 2016/0119134 A1 | 4/2016 | Hakoda et al. |
| 2016/0148198 A1 | 5/2016 | Kelley |
| 2016/0162897 A1* | 6/2016 | Feeney ............... H04L 9/3236 705/71 |
| 2016/0217436 A1 | 7/2016 | Brama |
| 2016/0239653 A1 | 8/2016 | Loughlin-Mchugh |
| 2016/0253663 A1 | 9/2016 | Clark et al. |
| 2016/0260091 A1 | 9/2016 | Tobias |
| 2016/0267472 A1 | 9/2016 | Lingham et al. |
| 2016/0267558 A1 | 9/2016 | Bonnell et al. |
| 2016/0275294 A1 | 9/2016 | Irvine |
| 2016/0283920 A1 | 9/2016 | Fisher et al. |
| 2016/0292396 A1 | 10/2016 | Akerwall |
| 2016/0292672 A1 | 10/2016 | Fay et al. |
| 2016/0292680 A1 | 10/2016 | Wilson, Jr. et al. |
| 2016/0294783 A1 | 10/2016 | Piqueras Jover |
| 2016/0300200 A1 | 10/2016 | Brown et al. |
| 2016/0300234 A1 | 10/2016 | Moss-Pultz et al. |
| 2016/0321675 A1 | 11/2016 | McCoy et al. |
| 2016/0321751 A1 | 11/2016 | Creighton, IV et al. |
| 2016/0321769 A1 | 11/2016 | Mccoy |
| 2016/0328791 A1 | 11/2016 | Parsells et al. |
| 2016/0330031 A1 | 11/2016 | Drego et al. |
| 2016/0330244 A1 | 11/2016 | Denton |
| 2016/0337119 A1 | 11/2016 | Hosaka et al. |
| 2016/0342977 A1 | 11/2016 | Lam |
| 2016/0342989 A1 | 11/2016 | Davis |
| 2016/0344737 A1 | 11/2016 | Anton et al. |
| 2016/0371771 A1 | 12/2016 | Serrano |
| 2017/0000613 A1 | 1/2017 | Lerf |
| 2017/0005797 A1 | 1/2017 | Lanc et al. |
| 2017/0005804 A1 | 1/2017 | Zinder |
| 2017/0033933 A1 | 2/2017 | Haber |
| 2017/0053249 A1 | 2/2017 | Tunnell et al. |
| 2017/0061396 A1 | 3/2017 | Melika et al. |
| 2017/0075938 A1 | 3/2017 | Black |
| 2017/0103167 A1 | 4/2017 | Shah |
| 2017/0124534 A1 | 5/2017 | Savolainen |
| 2017/0124535 A1 | 5/2017 | Juels et al. |
| 2017/0134162 A1 | 5/2017 | Code |
| 2017/0148016 A1 | 5/2017 | Davis |
| 2017/0161439 A1 | 6/2017 | Raduchel |
| 2017/0177898 A1 | 6/2017 | Dillenberger |
| 2017/0178237 A1 | 6/2017 | Wong |
| 2017/0213287 A1 | 7/2017 | Bruno |
| 2017/0221052 A1 | 8/2017 | Sheng |
| 2017/0228731 A1 | 8/2017 | Sheng |
| 2017/0236123 A1 | 8/2017 | Ali |
| 2017/0243208 A1 | 8/2017 | Kurian et al. |
| 2017/0243289 A1 | 8/2017 | Rufo |
| 2017/0244757 A1 | 8/2017 | Castinado et al. |
| 2017/0330279 A1 | 11/2017 | Ponzone |
| 2017/0344983 A1 | 11/2017 | Muftic |
| 2017/0346693 A1 | 11/2017 | Dix |
| 2017/0352031 A1 | 12/2017 | Collin |
| 2017/0353309 A1 | 12/2017 | Gray |
| 2017/0359374 A1 | 12/2017 | Smith |
| 2017/0364642 A1 | 12/2017 | Bogdanowicz |
| 2017/0373859 A1 | 12/2017 | Shors et al. |
| 2018/0005186 A1 | 1/2018 | Lerato |
| 2018/0075239 A1 | 3/2018 | Boutnaru |
| 2018/0075527 A1 | 3/2018 | Nagi et al. |
| 2018/0082043 A1 | 3/2018 | Witchey |
| 2018/0088928 A1 | 3/2018 | Smith |
| 2018/0091524 A1 | 3/2018 | Setty |
| 2018/0097779 A1 | 4/2018 | Karame et al. |
| 2018/0101701 A1 | 4/2018 | Barinov |
| 2018/0101842 A1 | 4/2018 | Ventura |
| 2018/0108024 A1 | 4/2018 | Greco |
| 2018/0117446 A1 | 5/2018 | Tran |
| 2018/0123779 A1 | 5/2018 | Zhang |
| 2018/0139042 A1 | 5/2018 | Binning |
| 2018/0144292 A1 | 5/2018 | Mattingly |
| 2018/0157700 A1 | 6/2018 | Roberts |
| 2018/0158034 A1 | 6/2018 | Hunt |
| 2018/0167201 A1 | 6/2018 | Naqvi |
| 2018/0173906 A1 | 6/2018 | Rodriguez |
| 2018/0176017 A1 | 6/2018 | Rodriguez |
| 2018/0181768 A1 | 6/2018 | Leporini |
| 2018/0182042 A1 | 6/2018 | Vinay |
| 2018/0189333 A1 | 7/2018 | Childress |
| 2018/0189781 A1 | 7/2018 | McCann |
| 2018/0204213 A1 | 7/2018 | Zappier |
| 2018/0219683 A1 | 8/2018 | Deery |
| 2018/0219685 A1 | 8/2018 | Deery |
| 2018/0225640 A1 | 8/2018 | Chapman |
| 2018/0225649 A1 | 8/2018 | Babar |
| 2018/0241565 A1 | 8/2018 | Paolini-Subramanya |
| 2018/0260888 A1 | 9/2018 | Paolini-Subramanya |
| 2018/0260889 A1 | 9/2018 | Paolini-Subramanya |
| 2018/0268162 A1 | 9/2018 | Dillenberger |
| 2018/0268382 A1 | 9/2018 | Wasserman |
| 2018/0268504 A1 | 9/2018 | Paolini-Subramanya |
| 2018/0276270 A1* | 9/2018 | Bisbee ............... G06F 16/2379 |
| 2018/0276668 A1 | 9/2018 | Li |
| 2018/0276745 A1 | 9/2018 | Paolini-Subramanya |
| 2018/0285879 A1 | 10/2018 | Gadnis |
| 2018/0285970 A1 | 10/2018 | Snow |
| 2018/0285971 A1 | 10/2018 | Rosenoer |
| 2018/0288022 A1 | 10/2018 | Madisetti |
| 2018/0315051 A1 | 11/2018 | Hurley |
| 2018/0316502 A1 | 11/2018 | Nadeau |
| 2018/0356236 A1 | 12/2018 | Lawrenson |
| 2018/0365201 A1 | 12/2018 | Lerato |
| 2018/0365686 A1 | 12/2018 | Kondo |
| 2018/0365764 A1 | 12/2018 | Nelson |
| 2018/0367298 A1 | 12/2018 | Wright |
| 2019/0012637 A1 | 1/2019 | Gillen |
| 2019/0013948 A1 | 1/2019 | Mercuri |
| 2019/0018947 A1 | 1/2019 | Li |
| 2019/0034459 A1 | 1/2019 | Honglin |
| 2019/0036887 A1 | 1/2019 | Miller |
| 2019/0036957 A1 | 1/2019 | Smith |
| 2019/0043048 A1 | 2/2019 | Wright |
| 2019/0044727 A1 | 2/2019 | Scott |
| 2019/0050855 A1 | 2/2019 | Martino |
| 2019/0057382 A1 | 2/2019 | Wright |
| 2019/0065709 A1 | 2/2019 | Salomon |
| 2019/0073666 A1 | 3/2019 | Ortiz |
| 2019/0080284 A1 | 3/2019 | Kim |
| 2019/0081793 A1 | 3/2019 | Martino |
| 2019/0087446 A1 | 3/2019 | Sharma |
| 2019/0123889 A1 | 4/2019 | Schmidt-Karaca |
| 2019/0132350 A1 | 5/2019 | Smith |
| 2019/0188699 A1 | 6/2019 | Thibodeau |
| 2019/0197532 A1 | 6/2019 | Jayachandran |
| 2019/0205563 A1 | 7/2019 | Gonzales, Jr. |
| 2019/0236286 A1 | 8/2019 | Scriber |
| 2019/0251557 A1 | 8/2019 | Jin |
| 2019/0253240 A1 | 8/2019 | Treat |
| 2019/0253258 A1 | 8/2019 | Thekadath |
| 2019/0268141 A1 | 8/2019 | Pandurangan |
| 2019/0268163 A1 | 8/2019 | Nadeau |
| 2019/0281259 A1 | 9/2019 | Palazzolo |
| 2019/0287107 A1 | 9/2019 | Gaur |
| 2019/0287199 A1 | 9/2019 | Messerges |
| 2019/0287200 A1 | 9/2019 | Schuler |
| 2019/0288832 A1 | 9/2019 | Dang |
| 2019/0296915 A1 | 9/2019 | Lancashire |
| 2019/0303623 A1 | 10/2019 | Reddy |
| 2019/0303887 A1 | 10/2019 | Wright |
| 2019/0306150 A1 | 10/2019 | Letz |
| 2019/0311357 A1 | 10/2019 | Madisetti |
| 2019/0324867 A1 | 10/2019 | Tang |
| 2019/0332691 A1 | 10/2019 | Beadles |
| 2019/0333054 A1 | 10/2019 | Cona |
| 2019/0334715 A1 | 10/2019 | Gray |
| 2019/0334912 A1 | 10/2019 | Sloane |
| 2019/0340607 A1 | 11/2019 | Lynn |
| 2019/0342422 A1 | 11/2019 | Li |
| 2019/0347444 A1 | 11/2019 | Lowagie |

(56) References Cited

U.S. PATENT DOCUMENTS

| | | |
|---|---|---|
| 2019/0347628 A1 | 11/2019 | Al-Naji |
| 2019/0349190 A1 | 11/2019 | Smith |
| 2019/0349426 A1 | 11/2019 | Smith |
| 2019/0354606 A1 | 11/2019 | Snow |
| 2019/0354607 A1 | 11/2019 | Snow |
| 2019/0354611 A1 | 11/2019 | Snow |
| 2019/0354724 A1 | 11/2019 | Lowagie |
| 2019/0354725 A1 | 11/2019 | Lowagie |
| 2019/0354964 A1 | 11/2019 | Snow |
| 2019/0356733 A1 | 11/2019 | Snow |
| 2019/0361917 A1 | 11/2019 | Tran |
| 2019/0372770 A1 | 12/2019 | Huiyue |
| 2019/0378128 A1 | 12/2019 | Moore |
| 2019/0385165 A1 | 12/2019 | Castinado |
| 2019/0386940 A1 | 12/2019 | Hong |
| 2019/0391540 A1 | 12/2019 | Westervelt |
| 2019/0391858 A1 | 12/2019 | Studnicka |
| 2019/0394044 A1 | 12/2019 | Snow |
| 2019/0394048 A1 | 12/2019 | Deery |
| 2020/0004263 A1 | 1/2020 | Dalla Libera |
| 2020/0004946 A1 | 1/2020 | Gilpin |
| 2020/0005290 A1 | 1/2020 | Madisetti |
| 2020/0034571 A1 | 1/2020 | Fett |
| 2020/0034813 A1 | 1/2020 | Calinog |
| 2020/0042635 A1 | 2/2020 | Douglass |
| 2020/0042960 A1 | 2/2020 | Cook |
| 2020/0042982 A1 | 2/2020 | Snow |
| 2020/0042983 A1 | 2/2020 | Snow |
| 2020/0042984 A1 | 2/2020 | Snow |
| 2020/0042985 A1 | 2/2020 | Snow |
| 2020/0042986 A1 | 2/2020 | Snow |
| 2020/0042987 A1 | 2/2020 | Snow |
| 2020/0042988 A1 | 2/2020 | Snow |
| 2020/0042990 A1 | 2/2020 | Snow |
| 2020/0042995 A1 | 2/2020 | Snow et al. |
| 2020/0044827 A1 | 2/2020 | Snow |
| 2020/0044856 A1 | 2/2020 | Lynde |
| 2020/0044857 A1 | 2/2020 | Snow |
| 2020/0065761 A1 | 2/2020 | Tatchell |
| 2020/0067907 A1 | 2/2020 | Avetisov |
| 2020/0075056 A1 | 3/2020 | Yang |
| 2020/0089690 A1 | 3/2020 | Qiu |
| 2020/0099524 A1 | 3/2020 | Schiatti |
| 2020/0099534 A1 | 3/2020 | Lowagie |
| 2020/0104712 A1 | 4/2020 | Katz |
| 2020/0118068 A1 | 4/2020 | Turetsky |
| 2020/0127812 A1 | 4/2020 | Schuler |
| 2020/0134760 A1 | 4/2020 | Messerges |
| 2020/0145219 A1 | 5/2020 | Sebastian |
| 2020/0167870 A1 | 5/2020 | Isaacson |
| 2020/0175506 A1 | 6/2020 | Snow |
| 2020/0195441 A1 | 6/2020 | Suen |
| 2020/0211011 A1 | 7/2020 | Anderson |
| 2020/0234386 A1 | 7/2020 | Blackman |
| 2020/0258061 A1 | 8/2020 | Beadles |
| 2020/0279324 A1 | 9/2020 | Snow |
| 2020/0279325 A1 | 9/2020 | Snow |
| 2020/0279326 A1 | 9/2020 | Snow |
| 2020/0280447 A1 | 9/2020 | Snow |
| 2020/0302433 A1 | 9/2020 | Green |
| 2020/0320097 A1 | 10/2020 | Snow |
| 2020/0320514 A1 | 10/2020 | Snow |
| 2020/0320521 A1 | 10/2020 | Snow |
| 2020/0320522 A1 | 10/2020 | Snow |
| 2020/0382480 A1 | 12/2020 | Isaacson |
| 2020/0389294 A1 | 12/2020 | Soundararajan |
| 2021/0044976 A1 | 2/2021 | Avetisov |
| 2021/0073212 A1 | 3/2021 | Conley |
| 2021/0090076 A1 | 3/2021 | Wright |
| 2021/0097602 A1 | 4/2021 | Eichel |
| 2021/0119785 A1 | 4/2021 | Ben-Reuven |
| 2021/0174353 A1 | 6/2021 | Snow |
| 2021/0200653 A1 | 7/2021 | Jetzfellner |
| 2021/0226769 A1 | 7/2021 | Snow |
| 2021/0226773 A1 | 7/2021 | Snow |
| 2021/0266174 A1 | 8/2021 | Snow |
| 2021/0272103 A1 | 9/2021 | Snow |
| 2021/0273810 A1 | 9/2021 | Lynde |
| 2021/0273816 A1 | 9/2021 | Deery |
| 2021/0326815 A1 | 10/2021 | Brody |
| 2021/0328804 A1 | 10/2021 | Snow |
| 2021/0342836 A1 | 11/2021 | Cella |
| 2021/0366586 A1 | 11/2021 | Ryan |
| 2022/0006641 A1 | 1/2022 | Snow |
| 2022/0012731 A1 | 1/2022 | Derosa-Grund |
| 2022/0019559 A1 | 1/2022 | Snow |
| 2022/0020001 A1 | 1/2022 | Snow |
| 2022/0027893 A1 | 1/2022 | Snow |
| 2022/0027897 A1 | 1/2022 | Snow |
| 2022/0027994 A1 | 1/2022 | Snow |
| 2022/0027995 A1 | 1/2022 | Snow |
| 2022/0027996 A1 | 1/2022 | Snow |
| 2022/0029805 A1 | 1/2022 | Snow |
| 2022/0030054 A1 | 1/2022 | Snow |
| 2022/0034004 A1 | 2/2022 | Snow |
| 2022/0043831 A1 | 2/2022 | Douglass |
| 2022/0058622 A1 | 2/2022 | Snow |
| 2022/0058623 A1 | 2/2022 | Snow |
| 2022/0103341 A1 | 3/2022 | Snow |
| 2022/0103343 A1 | 3/2022 | Snow |
| 2022/0103344 A1 | 3/2022 | Snow |
| 2022/0103364 A1 | 3/2022 | Snow |
| 2022/0198554 A1 | 6/2022 | Filter |

FOREIGN PATENT DOCUMENTS

| | | |
|---|---|---|
| CN | 112329041 A | 2/2021 |
| DE | 10128728 | 1/2003 |
| EP | 3726438 A1 | 10/2020 |
| EP | 3862947 A1 | 8/2021 |
| JP | 5383297 | 1/2014 |
| JP | 2021152931 A | 9/2021 |
| KR | 100653512 | 11/2006 |
| KR | 1747221 | 5/2017 |
| KR | 101747221 | 6/2017 |
| WO | WO 0049797 | 8/2000 |
| WO | WO 2007069176 | 6/2007 |
| WO | WO 2015077378 | 5/2015 |
| WO | 2017190795 A1 | 11/2017 |
| WO | WO 2018013898 A1 | 1/2018 |
| WO | WO 2018109010 | 6/2018 |
| WO | 2018127923 A1 | 7/2018 |
| WO | 2018127923072018 | 7/2018 |
| WO | 2019180702 | 9/2019 |
| WO | 2019207504 | 10/2019 |
| WO | 2020125839 A1 | 6/2020 |

OTHER PUBLICATIONS

Watanabe, Hiroki, et al. "Blockchain contract: Securing a blockchain applied to smart contracts." *2016 IEEE International Conference on Consumer Electronics (ICCE)*. IEEE, 2016.

Crosby, Michael et al., "BlockChain Technology, Beyond Bitcoin", Sutardja Center for Entrepreneurship & Technology, Berkeley Engineering, Oct. 16, 2015, 35 pages.

Alsolami, Fahad, and Terrance E. Boult. "CloudStash: using secret-sharing scheme to secure data, not keys, in multi-clouds." *Information Technology: New Generations (ITNG), 2014 11th International Conference on*. IEEE, 2014.

Unknown, "Midex", https://promo.midex.com/Midex_EN.pdf, 25 pages.

Unknown, Xtrade White Paper, https://xtrade1-9649.kxcdn.com/wp-content/uploads/2017/09/xtrade-whitepaper.pdf Feb. 7, 2018, 37 pages.

Haarmann, et al., "DMN Decision Execution on the Ethereum Blockchain," Hasso Plattner Institute, University of Potsdam, 15 pages.

Kim et al., "A Perspective on Blockchain Smart Contracts," Schulich School of Business, York University, Toronto, Canada, 6 pages.

Chakravorty, Antorweep, and Chunming Rong, "Ushare: user controlled social media based on blockchain." *Proceedings of the 11th*

(56) References Cited

OTHER PUBLICATIONS

*International Conference on Ubiquitous Information Management and Communication.* ACM, 2017.

Chen, Zhixong, and Yixuan Zhu. "Personal Archive Service System using Blockchain Technology: Case Study, Promising and Challenging." AI & Mobile Services (AIMS), 2017 IEEE International Conference on. IEEE, 2017.

Al-Naji, Nader et al., "Basis: A Price-Stable Cryptocurrency with an Algorithmic Central Bank" www.basis.io Jun. 20, 2017, 27 pages.

Unkown, "Federated Learning: Collaborative Machine Learning without Centralized Training Data" Apr. 6, 2017, 11 pages.

Casey, "BitBeat: Factom Touts Blockchain Tool for Keeping Record Keepers Honest", Wall Street Journal, Nov. 5, 2014.

Menezes, Alfred. J., et al. "Handbook of Applied Cryptography," 1997, CRC Press, p. 527-28.

White, Ron, "How Computers Work," Oct. 2003, QUE, Seventh Edition (Year: 2003).

Merkle Mountain Ranges (MMRs)-Grin Documentation, https://quentinlesceller.github.io/grin-docs/technical/building-blocks/merkle-mountain-ranges/, 5 pages, printed Jun. 1, 2022.

Merkle Mountain Ranges, https://github.com/opentimestamps/opentimestamps-server/blob/master/doc/merkle-mountain-range.md, 3 pages, printed Jun. 1, 2022.

Michelson, Kyle, et al., "Accumulate: An identity-based blockchain protocol with cross-chain support, human-readable addresses, and key management capabilities", Accumulate Whitepaper, v1.0, Jun. 12, 2022, 28 pages.

MOF-BC: A Memory Optimized and Flexible BlockChain for Large Scale Networks. lle:///C:/Users/eoussir/Documents/e-Red® 20Folder/16905961/NPL_MOF_BC_A%20Memory%20Optimized%20and%20Flexible%20Blockchain.pdf (Year:2018).

On blockchain and its integration with IoT. Challenges and opportunities. file:///C:/Users/eoussir/Downloads/1-s2.0S0167739X17329205-main%20(1). pdf (Year: 2018).

Feng and Luo, "Evaluating Memory-Hard Proof-of-Work Algorithms on Three Processors," PVLDB, 13(6): 898-911, 2020.

Luther, "Do We Need A "Fedcoin" Cryptocurrency?," ValueWalk, Newstex Global Business Blogs, Dec. 30, 2015 (Year: 2015).

Iddo Bentov, Bitcoin and Secure Computation with Money, May 2016 (Year: 2016).

United States: New Generation cryptocurrency, USDX Protocol, Offers Crypto Advantages and Fiat Pegging, Apr. 2, 2018 (Year: 2018).

Ana Reyna et al.; On blockchain and its integration with IoT. Challenges and opportunities. Future generation computer systems. vol. 88, Nov. 2018, pp. 173-190. https://www.sciencedirect.com/science/article/pii/S0167739X17329205 (Year: 2018).

Krol, Michal et al., "SPOC: Secure Payments for Outsourced Computations" https://arxiv.org/pdf/1807.06462.pdf. (Year: 2018).

Dai et al. TrialChain: A Blockchain-Based Platform to Validate Data Integrity in Large, Biomedical Research Studies arXiv: 1807.03662 Jul. 10, 2018 (Year: 2018).

Eberhardt et al., "ZoKrates—Scalable Privacy-Preserving Off-Chain Computations," https://ieeexplore.ieee.org/stamp/JSP?tp:::&arrnumber:::8726497. (Year:2018).

Luu et al., Making Smart Contracts Smarter, 2016.

Why offchain storage is needed for blockchain_V4_1 FINAL (Year: 2018), by IBM, 13 pages.

Written Opinion in PCT/US2021/040207, Inventor Snow, dated Oct. 7, 2021, 14 pages.

Muhamed et al. EduCTX: A Blockchain-Based Higher Education Credit Platform, https://ieeexplore.ieee.org/stamp/stamp.jsp?arnumber=8247166. (Year: 2017). 16 pages.

Fernandez-Carames et al.; A Review on the Use of Blockchain for the Internet of Things. https://ieeexplore.ieee.org/stamp/stamp.jsp?arnumber=8370027 (Year: 2018). 23 pages.

ZoKrates—Scalable Privacy-Preserving Off-Chain Computations, by Jacob Eberhardt, Stefan Tai, 8 pages, Nov. 3, 2011 (Year: 2011).

Kroeger, T. et al., The Case for Distributed Data Archival Using Secret Splitting with Percival, 6th International Symposium on Resilient Control Systems (available at IEEE Xplore), p. 204-209 (Year: 2013).

\* cited by examiner

AUDITING OF ELECTRONIC DOCUMENTS

CROSS-REFERENCE TO RELATED APPLICATIONS

This patent application is a divisional filing of U.S. application Ser. No. 15/465,702 filed Mar. 22, 2017 and since issued as U.S. Pat. No. 10,817,873, which is incorporated herein by reference in its entirety. This patent application also relates to U.S. application Ser. No. 15/419,033 filed Jan. 30, 2017 (since issued as U.S. Pat. No. 10,419,225), to U.S. application Ser. No. 15/419,042 filed Jan. 30, 2017, to U.S. application Ser. No. 15/435,612 filed Feb. 17, 2017 (since issued as U.S. Pat. No. 10,411,897), to U.S. application Ser. No. 15/452,760 filed Mar. 8, 2017, to U.S. application Ser. No. 15/456,067 filed Mar. 10, 2017, and to U.S. application Ser. No. 15/459,061 filed Mar. 15, 2017, with all patent applications incorporated herein by reference in their entireties.

BACKGROUND

The mortgage industry has learned from the past. The so-called mortgage crisis of 2007 exposed flaws in the mortgage industry. Many mortgages lacked sufficient documentation, checks and balances were not implemented, and fraud was alleged.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
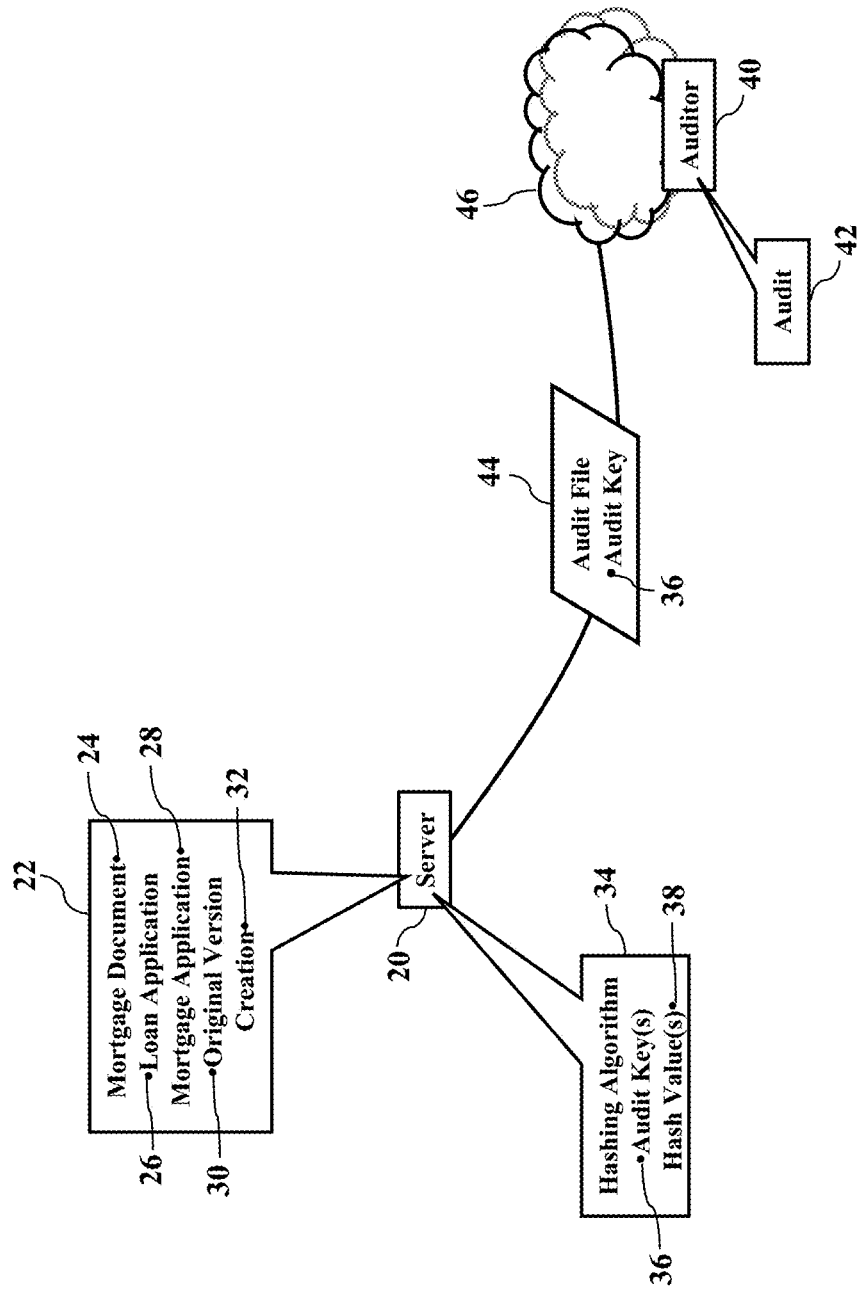
FIGS. 1-7 are simplified illustrations of auditing mortgage documents, according to exemplary embodiments.

FIGS. 1-7 are simplified illustrations of auditing mortgage documents, according to exemplary embodiments. FIG. 1 illustrates a server 20 storing electronic data 22 representing one or more electronic mortgage documents 24. The electronic mortgage documents 24 may be a part or a component of one or more loan applications 26. Indeed, many readers are likely familiar with an electronic mortgage application 28 that is processed when financing a mortgage for a home or business property. The electronic data 22, however, may be associated with any other type of loan, such as a vehicle installment, business or equipment purchase, and even equity lines of credit. Whatever the electronic data 22, the server 20 may retrieve the electronic data 22 representing an original version 30 of the electronic mortgage documents 24 at their date and time of creation 32. The server 20 may then hash the original version 30 of the electronic mortgage documents 24 using a cryptographic hashing algorithm 34. This disclosure defines a cryptographic "audit key" 36 as the hash value(s) 38 generated from hashing the original version 30 of the electronic mortgage documents 24. Exemplary embodiments may generate a single audit key 36 or multiple audit keys 36, as later paragraphs will explain.

FIG. 1 also illustrates an auditor 40. As the reader understands, financial records are often sampled and evaluated for correctness and for even fraud. The auditor 40 may thus randomly or periodically request an audit 42 of the electronic mortgage documents 24. When the auditor 40 requests the audit 42, the server 20 generates one or more audit files 44. That is, the server 20 may retrieve the cryptographic audit key(s) 36 generated from hashing the original version 30 of the electronic mortgage documents 24. The server 20 packages or associates the cryptographic audit key(s) 36 to the audit file 44 and sends the audit file 44 via a communications network 46 to the auditor 40 for examination, verification, and/or compliance.

Figure 2:
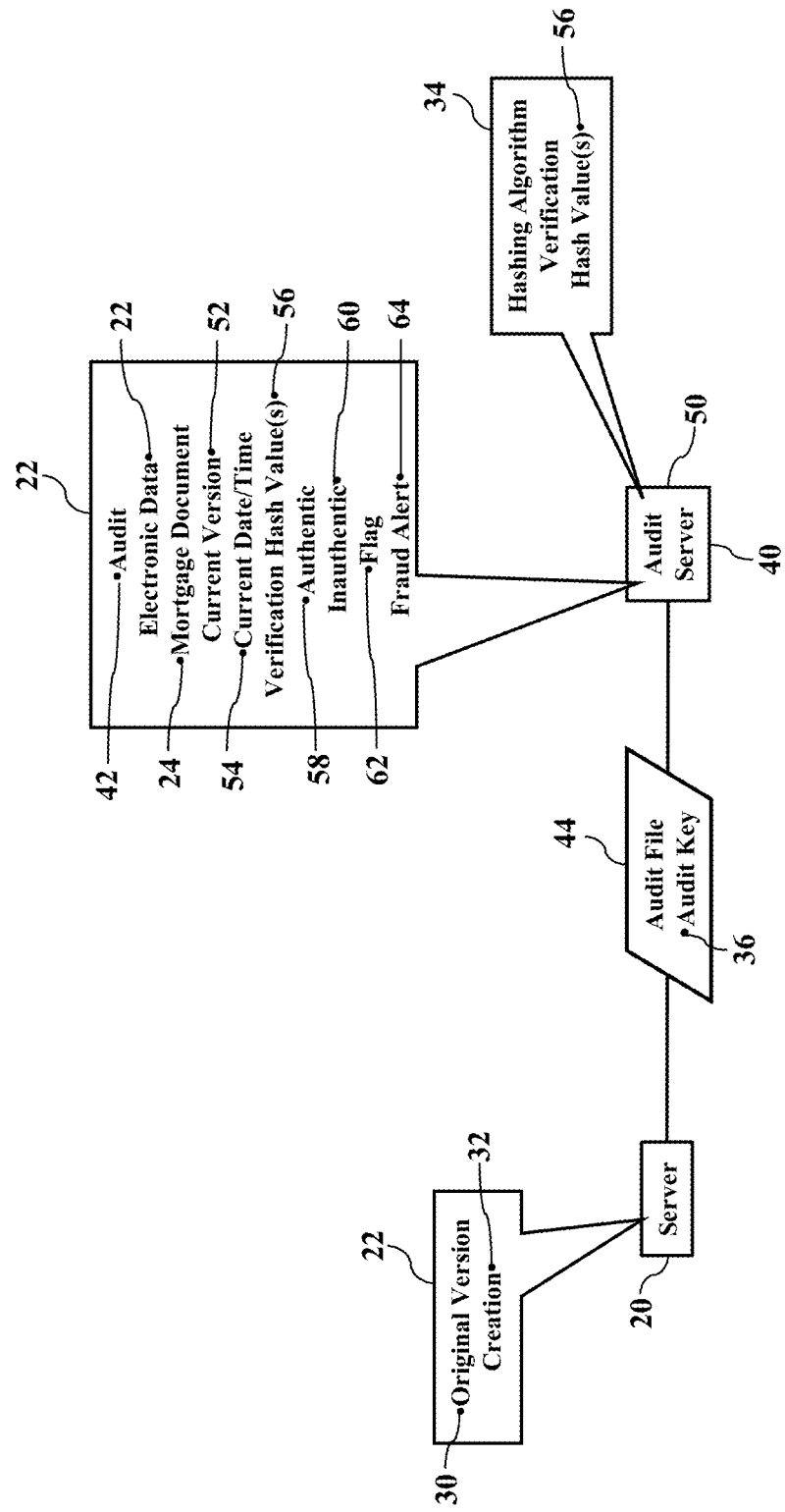

FIG. 2 illustrates an audit server 50. The audit server 50 operates on behalf of the auditor 40 (such as governmental entity or third party) to perform the audit 42. When the audit server 50 receives the audit file 44, the audit 42 may commence. For example, the audit server 50 may retrieve or receive the electronic data 22 representing a current version 52 of the electronic mortgage document 24. As the reader may understand, the current version 52 (perhaps as of a current date and time 54) may different, perhaps only slightly, from the original version 30 generated or saved approximately at the creation 32. Any difference between the original version 30 and the current version 52 may indicate an unintentional, or intentional, change to the electronic mortgage documents 24. Such a slight change is conventionally difficult to discern, especially by human inspection.

Exemplary embodiments, though, automate the audit 42. Exemplary embodiments compare the cryptographic audit key(s) 36 to the current version 52 of the electronic mortgage documents 24. That is, the audit server 50 may independently hash the electronic data 22 representing the current version 52 of the electronic mortgage documents 24 (using the same cryptographic hashing algorithm 34) to generate one or more verification hash values 56. If the verification hash values 56 match the cryptographic audit keys 36 sent via the audit file 44, then the electronic mortgage document 24 has not changed since the date and time of creation 32. That is, the current version 52 of the electronic mortgage documents 24 is the same as the original version 30, unaltered, and thus authentic 58. However, if the verification hash values 56 (generated from hashing the current version 52 of the electronic mortgage documents 24) fail to match the cryptographic audit keys 36 incorporated into the audit file 44, then the electronic mortgage documents 24 have changed since the date and time of creation 32. The audit file 44, in other words, reveals an alteration that may indicate the current version 52 is inauthentic 60. Exemplary embodiments may thus generate a flag 62 or other fraud alert 64 to initiate further investigation.

Exemplary embodiments thus present elegant auditing tools. Exemplary embodiments may provide the auditor 40 with both the cryptographic hash of the original version 30 and the raw electronic data 22 representing the current version 52. If the auditor 40 substantially or exactly matches the digital signatures (e.g., the verification hash values 56 and the cryptographic audit keys 36), then perhaps the audit 42 is complete and no further inquiry is required. But if the current version 52 has changed, the digital signatures will differ, perhaps even substantially. Indeed, even a change to a single character in a single word can produce a noticeable difference in hash values. So, if the digital signatures are different, the current version 52 of the electronic mortgage documents 24 may fail an authentication (e.g., the authentic 58 or inauthentic 60 determination). The auditor 40 may have thus discovered an altered/forged version of the electronic mortgage documents 24.

Figure 3:
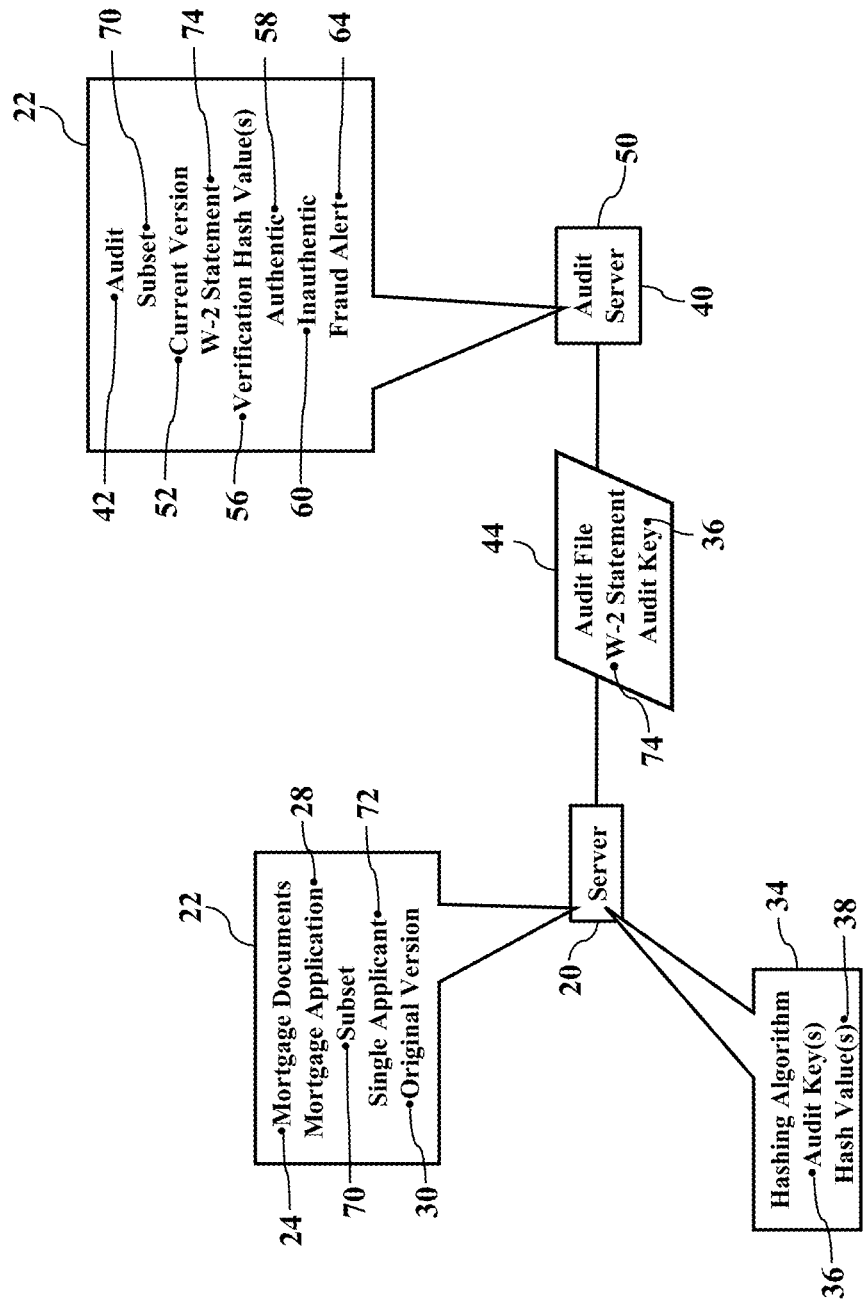

FIG. 3 further illustrates the audit file 44. Here the audit file 44 may include a subset 70 of the electronic mortgage documents 24 from a single electronic mortgage application 28. The reader likely understands that the electronic mortgage application 28 contains many different and separate documents. For example, the electronic mortgage application 28 may include an applicant's tax returns, employment verification, pay stubs, bank statements, and other documents. The electronic mortgage application 28 may also contain application paperwork (such as a Uniform Residential Loan Application), purchase agreement, appraisal, title history, and still many more documents. The audit file 44, though, may contain the electronic data 22 representing a sample of all the documents or pages representing the electronic mortgage application 28 associated with a single applicant 72. Suppose, for example, that the audit file 44 only contains the subset 70 representing the original version 30 of an IRS W-2 statement 74 associated with the single applicant 72 (e.g., name, address, and/or social security number). The server 20 sends the audit file 44 to the auditor 40 (e.g., the audit server 50) for examination and verification. When the audit server 50 receives the audit file 44, the audit server 50 performs the audit 42 of the subset 70 representing the IRS W-2 statement 74. That is, the audit server 50 may compare the cryptographic audit key 36 (generated from hashing the original version 30 of the IRS W-2 statement 74) to the current version 52 of the IRS W-2 statement 74. If the verification hash value(s) 56 (representing the current version 52 of the IRS W-2 statement 74) matches the cryptographic audit key 36 (generated from the original version 30 at the creation 32), then the applicant's IRS W-2 statement 74 is authentic 58 and perhaps no further auditing is required. However, if the verification hash value 56 fails to match the cryptographic audit key 36, then the applicant's IRS W-2 statement 74 has changed since the date and time of creation 32. Exemplary embodiments have thus discovered an alteration to the applicant's IRS W-2 statement 74. The current version 52 of the IRS W-2 statement 74 may thus be inauthentic 60, so exemplary embodiments may thus escalate the audit 42 and, perhaps, generate the fraud alert 64.

Figure 4:
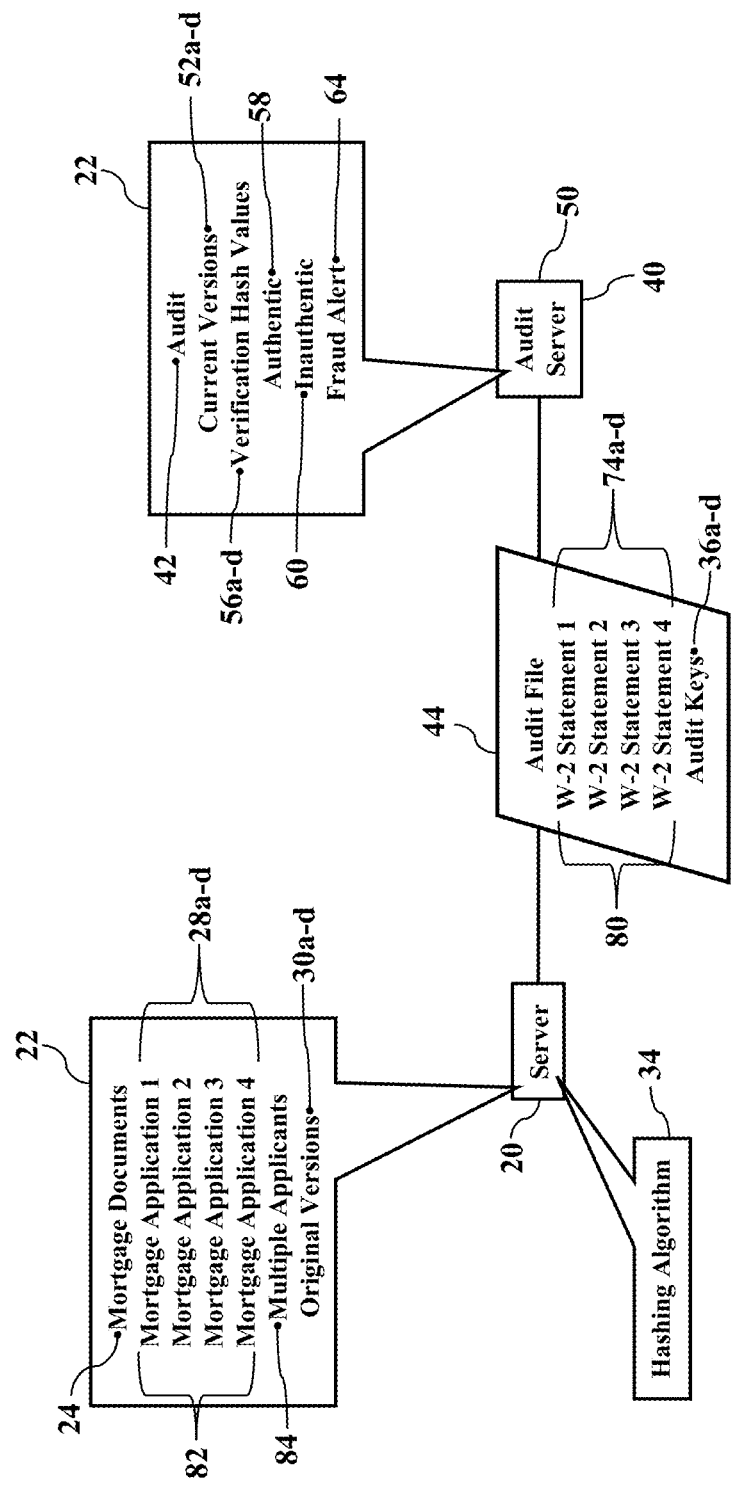

FIG. 4 also illustrates the audit file 44. Here, though, the audit file 44 may include a collection 80 of the electronic mortgage documents 24 from a set 82 of multiple electronic mortgage applications 28. The audit file 44 may thus contain the electronic data 22 representing a sampling of the electronic mortgage documents 24 associated with multiple and different applicants 84. While exemplary embodiments may sample any number of electronic mortgage applications 28, for simplicity FIG. 4 illustrates four (4) electronic mortgage applications 28*a-d*. Moreover, even though each applicant's electronic mortgage application 28*a-d* may contain hundreds of pages/forms, FIG. 4 for simplicity again illustrates the corresponding IRS W-2 statements 74*a-d*. That is, the audit file 44 may contain the collection 80 of the IRS W-2 statements 74*a-d* associated with each applicant's electronic mortgage application 28*a-d*. The server 20 sends the audit file 44 to the auditor 40 for examination and verification. If the audit server 50 matches any corresponding cryptographic audit key 36*a-d* (generated from hashing the original versions 30*a-d*) to the current version 52*a-d* of the IRS W-2 statements 74*a-d*, then the applicant's corresponding IRS W-2 statement 74*a-d* is unaltered and authentic 58. However, if the verification hash value 56*a-d* fails to match the cryptographic audit key 36a-d, then the corresponding applicant's IRS W-2 statement 74a-d has changed since its date and time of creation 32a-d. Exemplary embodiments may thus escalate the audit 42 and, perhaps, generate the fraud alert 64.

Figure 5:
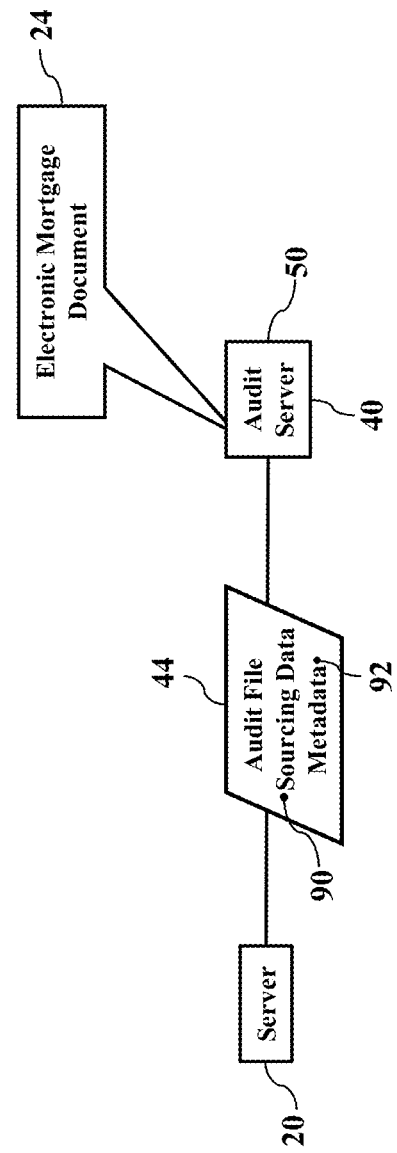

FIG. 5 illustrates sourcing data 90. Here the audit file 44 may include the sourcing data 90 associated with any of the electronic mortgage documents 24. The sourcing data 90 specifies from where the corresponding electronic mortgage document 24 may be obtained. That is, the sourcing data 90 specifies a network location, address, website, and/or other information associated with a networked device or server that physically stores the electronic mortgage document 24. The sourcing data 90 may be as simple or detailed as needed to ease access to the electronic mortgage document 24. The sourcing data 90, for example, may be defined as [{"Source":{"Name": "Wells Fargo System XXX"}, {"ID": "YYY"}, {"Access Link":"https://foo.wellsfargo.com"} . . . ] and textually written or encoded as metadata 92. The sourcing data 90 may thus specify one or more uniform resource locators (URLs) as website links from where the corresponding electronic mortgage document 24 (document identifier "ID":YYY") may be queried and retrieved. The sourcing data 90 may thus be populated by an originator or creator of the electronic mortgage document 24. The sourcing data 90 may also be populated by an owner of the electronic mortgage document 24 (such as lender or contractor). The sourcing data 90 may thus be added as the metadata 92 to the audit file 44. When the audit server 50 receives the audit file 44, the audit server 50 may thus read and/or retrieve the sourcing data 90 to retrieve the corresponding electronic mortgage document 24.

Figure 6:
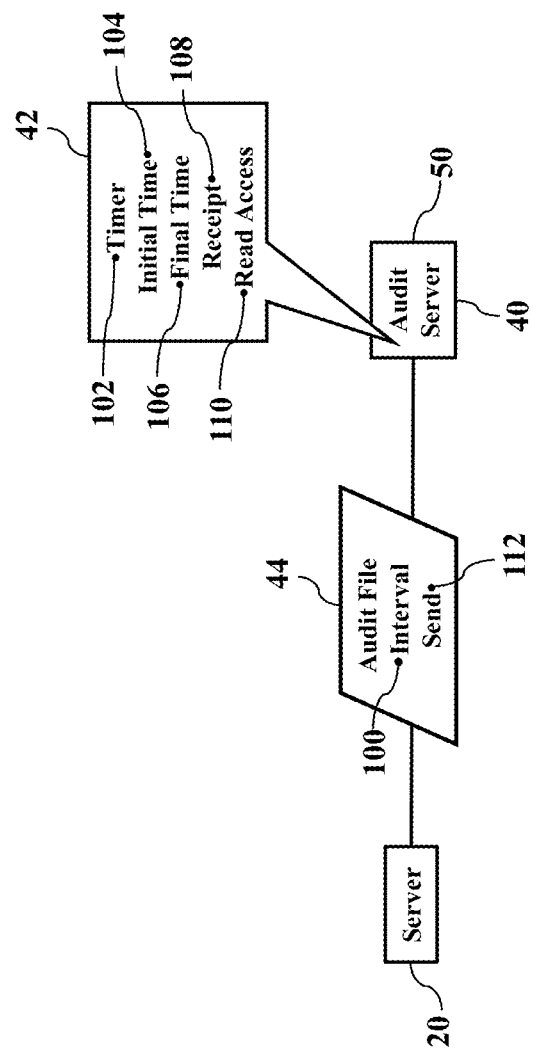

FIG. 6 illustrates a timing requirement. Here the audit file 44 may include data or information specifying an auditing interval 100 of time in which the audit 42 must be commenced and/or completed. The audit file 44 may thus cause the audit server 50 to call or invoke a timing mechanism (such as a timer 102) that begins counting up, or down, from an initial time 104 to a final time 106. If the auditing interval 100 of time expires prior to commencement or completion of the audit 42, exemplary embodiments may decline further access to, and/or read usage of, the audit file 44. The auditing interval 100 of time may thus be a time box or window that increments from a date/time of receipt 108, or at date/time of initial read access 110, by the audit server 50. The auditing interval 100 of time may additionally or alternatively increment at a date/time of sending 112 the audit file 44 from the server 20. The audit file 44 may have additional configuration options that further define the access or usage conditions related to the auditing interval 100 of time.

Figure 7:
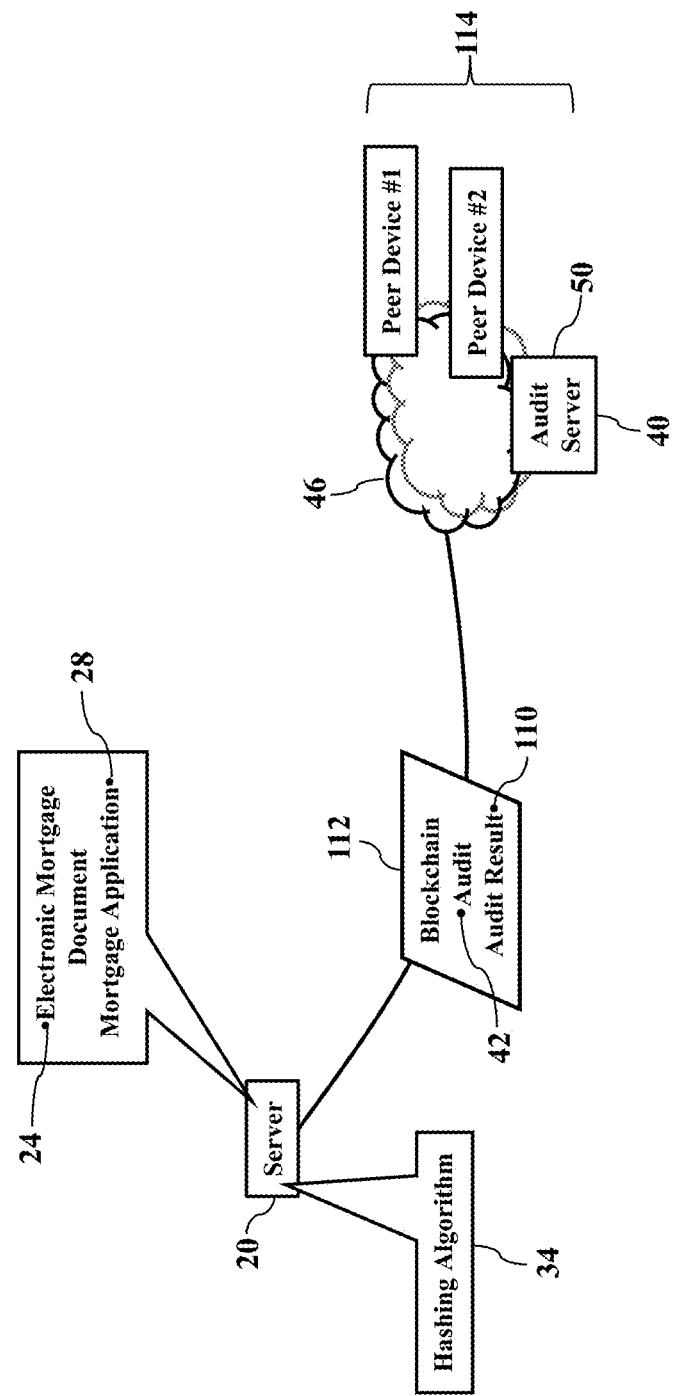

FIG. 7 illustrates audit records. Here exemplary embodiments may record the audit 42, and/or an audit result 110, as a record in a blockchain 112. As the reader may understand, the blockchain 112 is generally a digital ledger in which transactions are chronologically and/or publically recorded. The blockchain 112 is most commonly used in decentralized cryptocurrencies (such as Bitcoin). The blockchain 112, however, may be adapted to any chain or custody (such as the electronic mortgage document(s) 24 representing the electronic mortgage application(s) 28). Indeed, there are many different mechanisms and configurations of the blockchain 112, and exemplary embodiments may be adapted to any version. Regardless, the audit result 110 may be integrated into the blockchain 112 for distribution or publication to one or more trusted peer devices 114 (such as the audit server 50). As a simple example, if the IRS W-2 statement 74 is true and unaltered (as explained with reference to FIG. 3), the auditing result or determination may be added to, or incorporated in, any record, transaction, or block and distributed via the blockchain 112. However, if the current version 52 has been altered, the inauthentic 60 determination (and the fraud alert 64) may be recorded. Indeed, any details related to the audit 42 (such as a date of the audit 42 and an auditor identifier that uniquely identifies the auditor 40) may be integrated into the blockchain 112. The audit server 50 may also hash the audit result 110 (using the cryptographic hashing algorithm 34) to generate hash values representing a digital signature (such as an audit result key) that may also be integrated into the blockchain 112 for historical documentation.

Exemplary embodiments may be applied to any electronic document. Most readers are thought familiar with mortgage documents. This disclosure thus mainly explains auditing of mortgage documents. Exemplary embodiments, though, may be applied to auditing of any electronic data representing any document.

Figure 8:
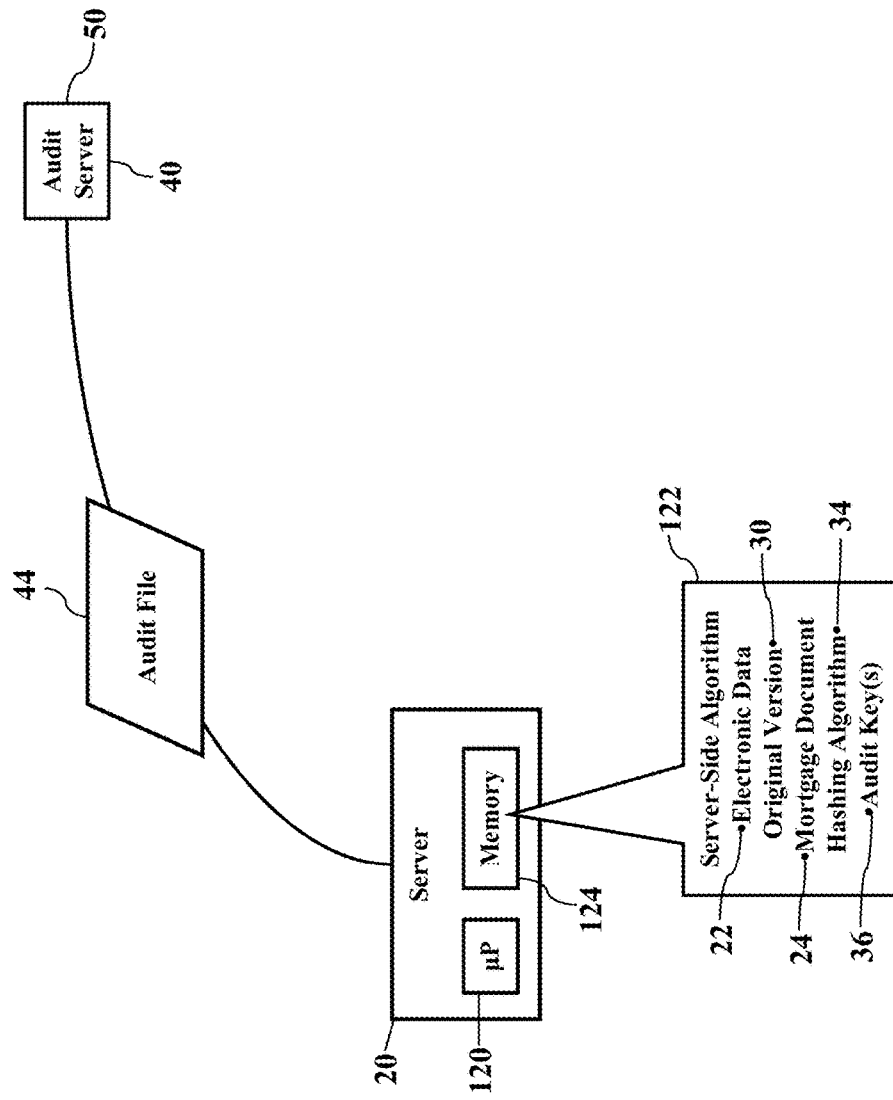
FIGS. 8-9 are detailed illustration of an operating environment, according to exemplary embodiments.
Figure 9:
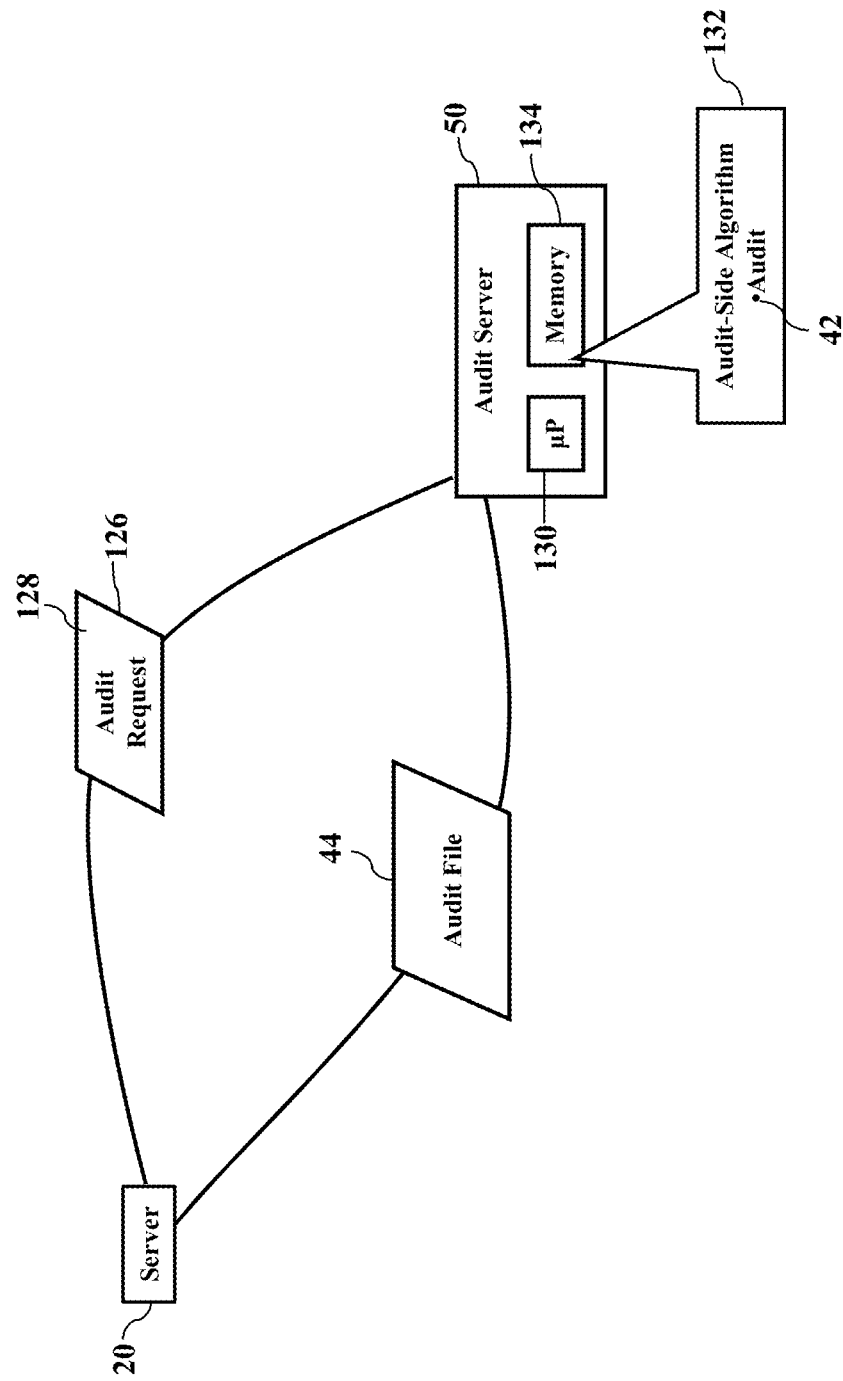
Figure 10:
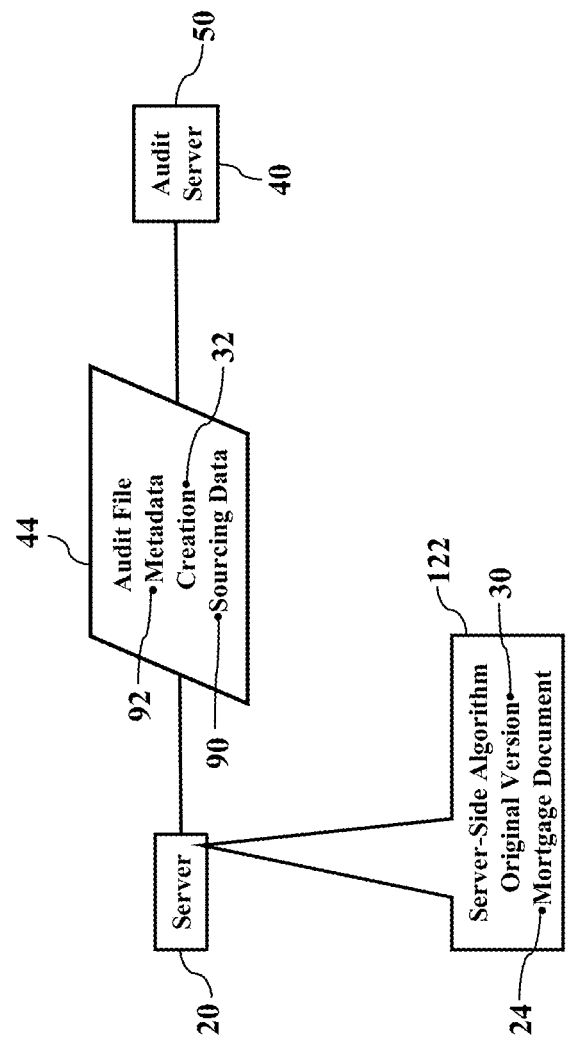
FIGS. 10-14 illustrate an audit file, according to exemplary embodiments.

FIGS. 8-9 are detailed illustration of an operating environment, according to exemplary embodiments. FIG. 8 illustrates the server 20 communicating with the audit server 50 (via the communications network 46 illustrated in FIGS. 1 and 7). The server 20 may have a processor 120 (e.g., "μP"), application specific integrated circuit (ASIC), or other component that executes a server-side algorithm 122 stored in a local memory device 124. The server-side algorithm 122 includes instructions, code, and/or programs that cause the server 20 to perform operations, such as hashing the electronic data 22 representing the original version 30 of the electronic mortgage document 24 (using the hashing algorithm 34) to generate the audit key(s) 36 and the audit file 44 (as the above paragraphs explained). The server-side algorithm 122 may also instruct or cause the server 20 to send the audit file 44 to the audit server 50. The server-side algorithm 122 may also instruct or cause the server 20 to send the audit file 44 to any IP address associated with any network destination or device.

Exemplary embodiments may use any hashing function. Many readers may be familiar with the SHA-256 hashing algorithm that generates a 256-bit hash value. Exemplary embodiments obtain or retrieve the electronic data 22 representing the original version 30. The SHA-256 hashing algorithm acts on the electronic data 22 to generate a 256-bit hash value as the cryptographic audit key 36. The audit key 36 is thus a digital signature that uniquely represents the electronic data 22. There are many hashing algorithms, though, and exemplary embodiments may be adapted to any hashing algorithm.

FIG. 9 illustrates auditing instructions. When the auditor 40 wishes to perform the audit 42, the audit server 50 sends an audit request 126. The audit request 126 includes data or information that specifies a subject 128 of the audit 42. The subject 128 may be broadly or narrowly specified to ensnare a single document, a single mortgage application, multiple documents from the single mortgage application, the single document from multiple mortgage applications, or multiple documents from the multiple mortgage applications. In general, then, the audit request 126 may specify a document range identifying the document(s) to be audited and an applicant range identifying the applicant name(s) and/or mortgage application(s) to be audited. The audit server 50 may have a processor 130 (e.g., "μP"), application specific integrated circuit (ASIC), or other component that executes an audit-side algorithm 132 stored in a local memory device 134. The audit-side algorithm 1332 includes instructions, code, and/or programs that cause the audit server 50 to perform operations, such as generating the audit request 126 and sending the audit request 126 to the IP address associated with the server 20. The server 20 thus generates the audit file 44 as a response to the audit request 126. The server 20 and the audit server 50 may thus cooperate to perform the audit 42 of the electronic mortgage documents 24 based on the audit file 44.

Exemplary embodiments may be applied regardless of networking environment. Exemplary embodiments may be easily adapted to stationary or mobile devices having cellular, wireless fidelity (WI-FI®), near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations," this could include the processor performing the operations directly and/or facilitating, directing, or cooperating with another device or component to perform the operations.

Exemplary embodiments may packetize. The server 20 and the audit server 50 may have network interfaces to the communications network 46, thus allowing collection and retrieval of information. The information may be received as packets of data according to a packet protocol (such as the Internet Protocol). The packets of data contain bits or bytes of data describing the contents, or payload, of a message. A header of each packet of data may contain routing information identifying an origination address and/or a destination address.

FIGS. 10-14 further illustrate the audit file 44, according to exemplary embodiments. Here the audit file 44 may include the metadata 92 associated with the original version 30 of the electronic mortgage document(s) 24. For example, the metadata 92 may describe the creation 32 (such as {"CreationTime":"2012-05-07T11:12:32"}). The metadata 92 may additionally or alternatively describe the sourcing data 90 (such as {"SourceID": "1131122"} or {"Location": "Wells Fargo System XXX, ID YYY"}). The metadata 92 may describe the applicant, a location (such as GPS information at creation 32), word/character count, and an abstract describing or summarizing the electronic mortgage document(s) 24. The metadata 92 may also include one or more keywords associated with any of the electronic mortgage document(s) 24. The metadata 92 may also include a file hierarchy where the electronic mortgage document(s) 24 is stored and/or a network address for retrieval. The network address, for example, may be associated with a source server or other machine locally or remotely storing the electronic mortgage document(s) 24. The metadata 92 may also include structural details, such as file size, page numbering, chapter organization, and image data. Other metadata 92 may describe approved users (such as administrator and user permissions or identities) and digital rights management (or "DRM"). The metadata 92 may be formatted according to any standard. The audit file 44 may thus include any metadata 92 associated with the electronic mortgage document(s) 24.

Figure 11:
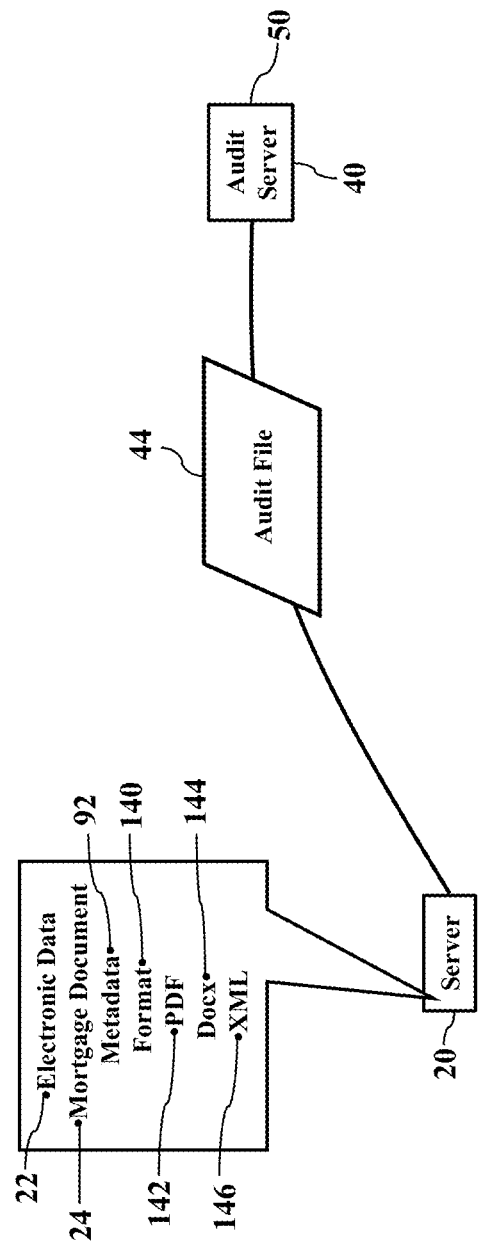

FIG. 11 illustrates formatting. Here the electronic data 22 representing the metadata 92 may describe one or more formats 140. Most readers, for example, are thought familiar with a portable document format ("PDF") 142, the MICROSOFT® WORD® extensible markup language extension ("docx") 144, and/or the extensible markup language ("XML") 146. Exemplary embodiments, though, may be applied to any file formatting and/or specification. The format 140 may be proprietary, free, unpublished, and/or open. The format 140 may be designed for images, containers, audio, video, text, subtitles, control characters, and encoding schemes. The format 140 may be HTML, vector graphics, source code, text files, syntax, and software programming. Whatever the format 140, exemplary embodiments may retrieve the electronic data 22 representing the format 140 of any electronic mortgage document 24. The audit file 44 may thus include any metadata 92 associated with the format 140 of the electronic mortgage document(s) 24.

Figure 12:
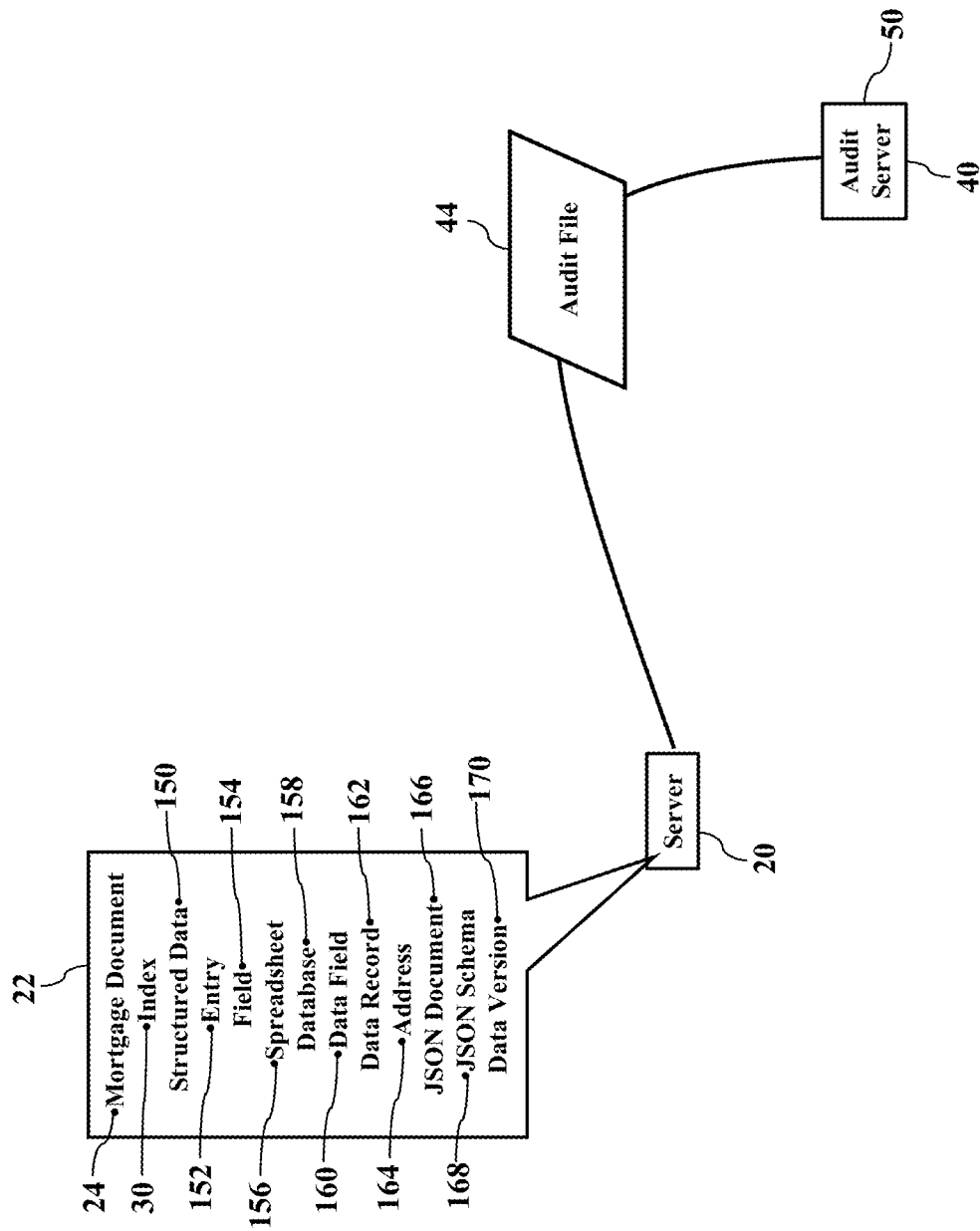

FIG. 12 illustrates structured data 150. As the reader may understand, the electronic data 22 representing the electronic mortgage document 24 may be the structured data 150. That is, the structured data 150 may be organized (such as an entry 152 or database field 154 in a relational spreadsheet 156 or database 158), contained within a fixed data field 160 or data record 162, and/or be addressable via a network or memory address 164. Again referencing the electronic mortgage application 28, the structured data 150 may be organized according to the JavaScript Object Notation (or "JSON"). As the JavaScript Object Notation is a known format for structuring data, the JSON format need not be explained in detail. Suffice it to say that at least some of the electronic data 22 representing the electronic mortgage document 24 and/or the audit file 44 may be a JSON document 166 having the structured data 150 arranged as fields, formatted according to a JSON schema 168.

Exemplary embodiment may thus incorporate a data version 170 in the audit file 44. For example, if the electronic mortgage document 24 and/or the audit file 44 is the JSON document 166, then the data version 170 may be the structured data 150 arranged or formatted according to the JSON schema 168. Exemplary embodiments may thus retrieve and incorporate the data version 170 in the audit file 44.

Figure 13:
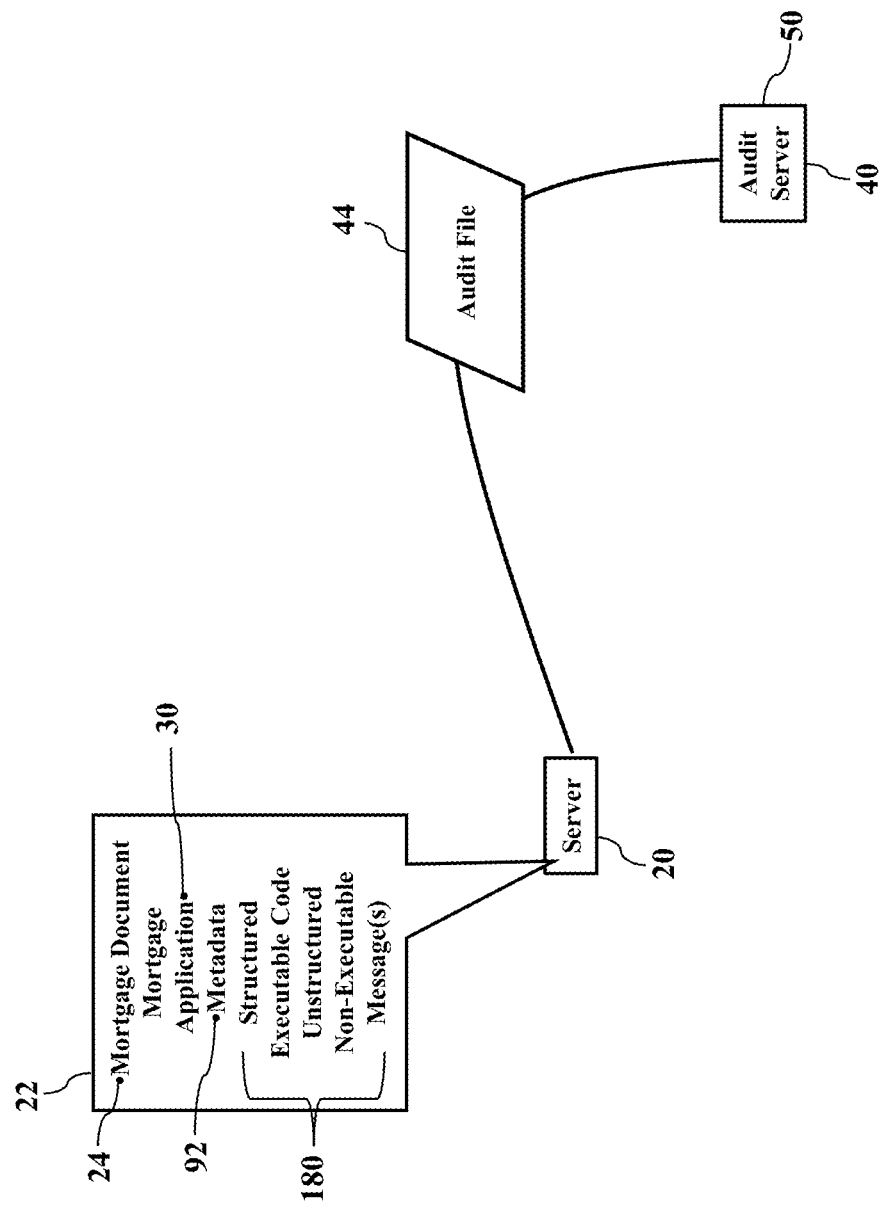

FIG. 13 illustrates instructions 180. Here the audit file 44 may include the instructions 180. While exemplary embodiments may be applicable to any instructions, the instructions 180 may be structured (such as executable code), unstructured instructions (such as non-executable commentary lines in code, such as English language "do thing 1, then thing 2, then thing 3"). Other instructions 180 may include any messages (such as "When this document is accessed, POST to the URL http://some.target.url"). Exemplary embodiments may thus retrieve and incorporate the instructions 180 into the audit file 44.

Figure 14:
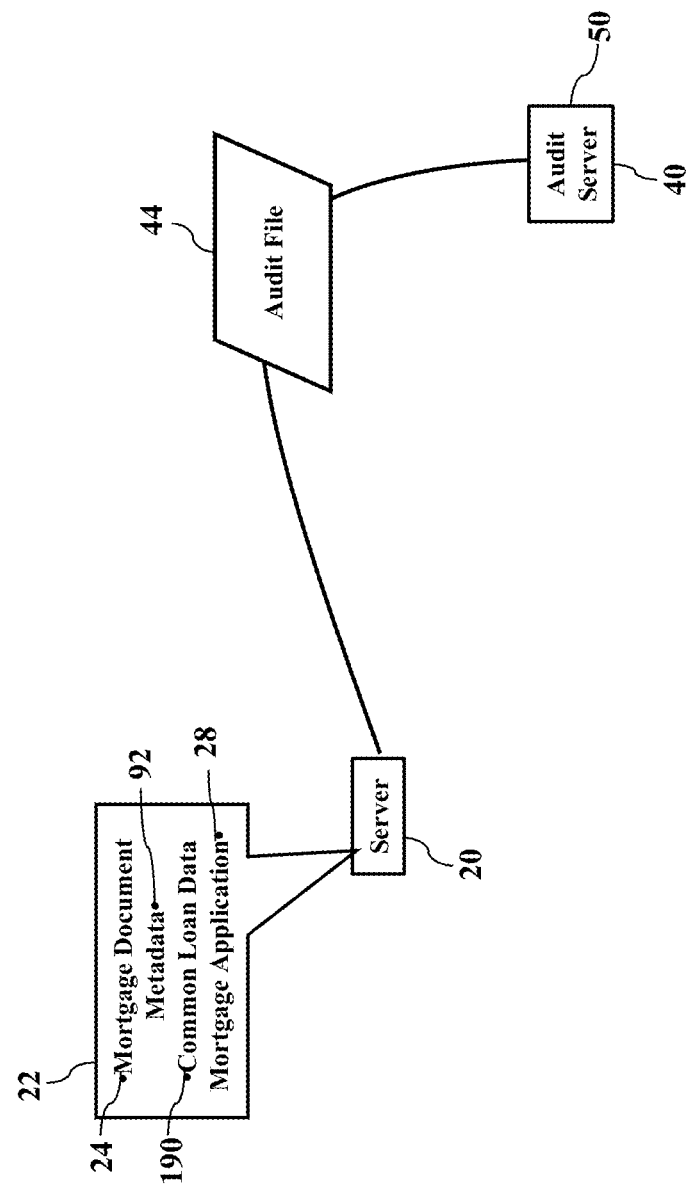

FIG. 14 illustrates common loan data 190. Here the audit file 44 may include data or information that is common or applicable to each electronic mortgage document 24 described, referenced, or included within the audit file 44. For example, each electronic mortgage document 24 may be associated with the metadata 92 describing a common geographic location (e.g., street, city, state, and/or ZIP). The common loan data 190 may additionally or alternatively specify a single or common document or page (again, such as the IRS W-2 statement 74 included in each electronic mortgage application 28, as explained with reference to FIGS. 3-4). Similarly, the common loan data 190 may also include or describe a financial lender (such as WELLS FARGO' or BANK OF AMERICA®) offering, evaluating, and/or processing the electronic mortgage applications 28. Whatever the common loan data 190 describes, exemplary embodiments may incorporate the common loan data 190 into the audit file 44.

Figure 15:
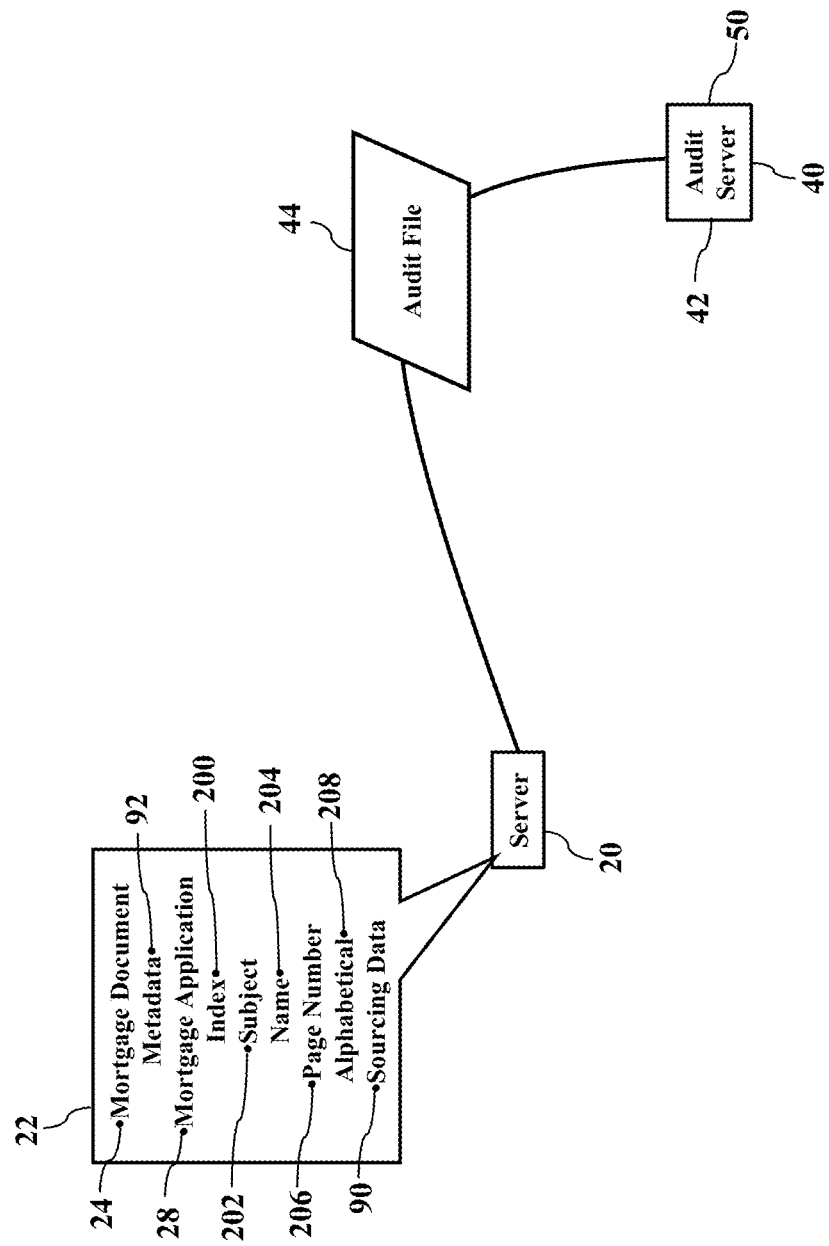
FIG. 15 illustrates an index, according to exemplary embodiments.

FIG. 15 illustrates an index 200, according to exemplary embodiments. Here the audit file 44 may include the index 200. The index 200 may list or describe any or of all the electronic mortgage documents 24 that are included within, or referenced by, the audit file 44. Because the audit file 44 may contain many different and separate documents, the index 200 may be provided as a courtesy to the auditor 40 performing the audit 42. Indeed, the audit request 126 (explained with reference to FIG. 9) may even require the index 200. The index 200 may be generated from the electronic data 22 representing the electronic mortgage documents 24. The index 200, for example, may be generated from the metadata 92 associated with the electronic mortgage documents 24. The index 200 may be also arranged by topical subject 202, document name 204, and/or page number 206 to promote auditing efforts. The index 200 may additionally or alternatively be alphabetically arranged 208 to aid human search and retrieval. The index 200 may even describe and/or locate the metadata 92 associated with each electronic mortgage document 24. The index 200 may also describe the sourcing data 90 specifying the storage/retrieval location for each electronic mortgage document 24. When the auditor 40 (such as the audit server 50) receives the audit file 44, the index 200 permits easy machine or user access to the informational components within the audit file 44.

Figure 16:
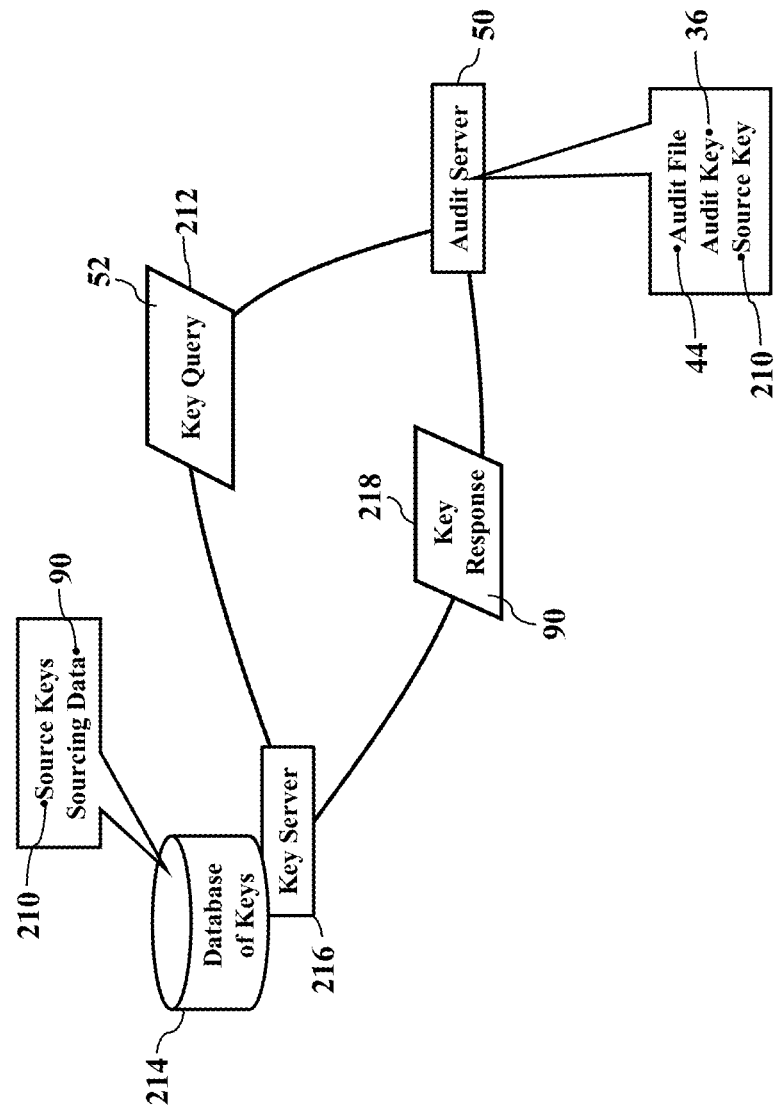
FIGS. 16-18 illustrate sourcing, according to exemplary embodiments.
Figure 17:
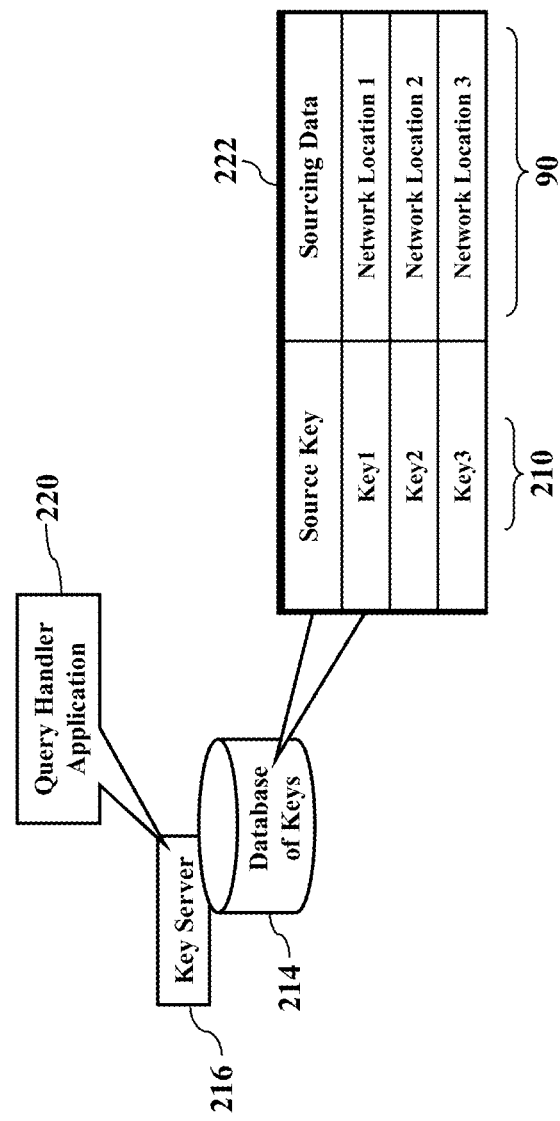
Figure 18:
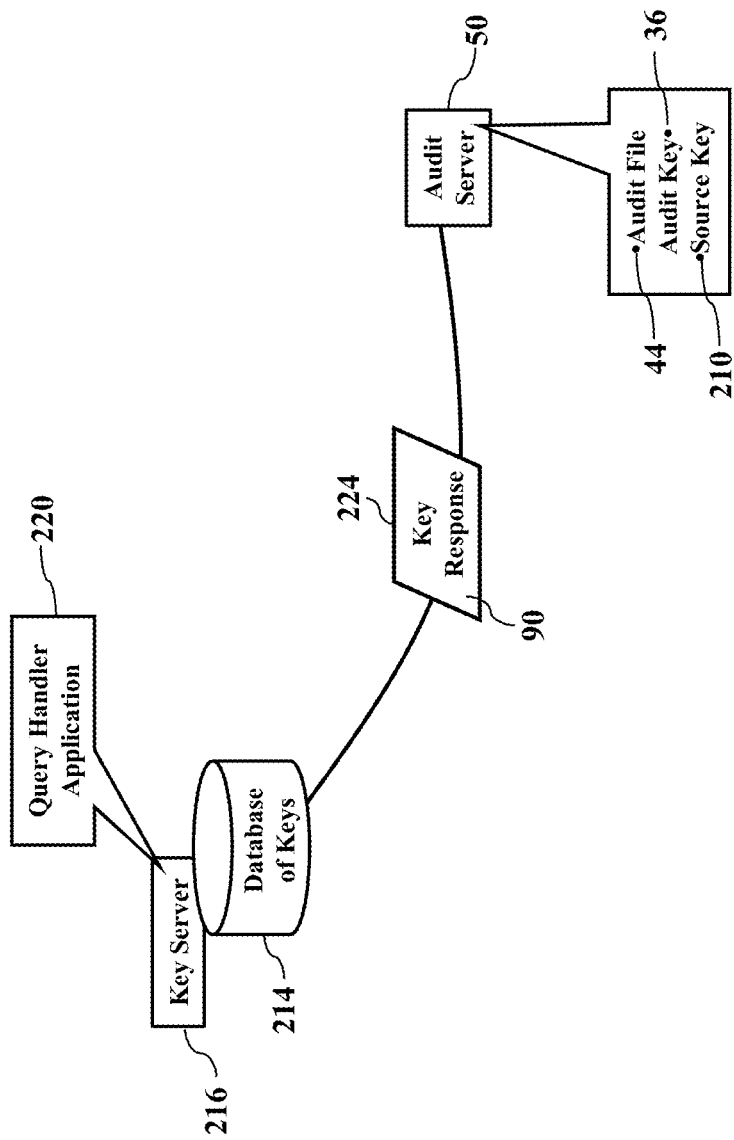

FIGS. 16-18 illustrate sourcing, according to exemplary embodiments. Here the sourcing data 90 may be used to retrieve the original version 30 and/or the current version 52 of the electronic mortgage document 24. When the audit server 50 receives the audit file 44, the audit file 44 may include or specify the cryptographic audit key 36 (as this disclosure above explains). The cryptographic audit key 36 may thus represent a unique digital signature generated from hashing the metadata 92 describing the sourcing data 90 representing a storage or network location (as explained with reference to FIGS. 5 and 10). Exemplary embodiments may thus generate one or more source keys 210 as the hash value(s) generated from hashing the sourcing data 90. Once the audit server 50 receives the audit file 44, the audit server 50 may thus read and/or retrieve the source key(s) 210 to easily and quickly discover the storage location of the corresponding original version 30 and/or the current version 52 of the electronic mortgage document 24. That is, the source key 210 may be used to reverse lookup the sourcing data 90. The audit server 50 generates and sends a key query 212 to the network address associated with an electronic database 214 of keys. FIG. 16 illustrates a key server 216 storing or maintaining the electronic database 214 of keys. The electronic database 214 of keys, however, may be stored at maintained at any network device or location. The electronic database 214 of keys stores entries that electronically associate different source keys 210 to their corresponding sourcing data 90. The audit server 50 queries the key server 216 (via the communications network 46 illustrated in FIGS. 1 and 7) for the source key 210 received via the audit file 44. The key server 216 retrieves the corresponding sourcing data 90 and sends a key response 218 to the audit server 50. The key response 218 includes information describing the sourcing data 90 retrieved from the electronic database 214 of keys. Exemplary embodiments thus allow the audit server 50 to translate or convert the source key 210 into its corresponding sourcing data 90.

FIG. 17 further illustrates the electronic database 214 of keys. The key server 216 functions to answer queries submitted by authorized clients. That is, the key server 216 executes a query handler application 220 that accepts the source key 210 as a query term. The query handler application 220 may then search the electronic database 214 of keys for a matching entry. While the electronic database 214 of keys may have any structure, FIG. 17 illustrates the electronic database 214 of keys as a table 222 that electronically maps, relates, or associates different source keys 210 to their corresponding sourcing data 90. The electronic database 214 of keys may thus be loaded or configured with data or information for determining the retrieval locations of mortgage documents. If a match is determined, the corresponding sourcing data 90 is identified. FIG. 17 illustrates the electronic database 214 of keys as being locally stored in the key server 216, but some of the database entries may be dispersed to multiple other devices or locations in the communications network (illustrated as reference numeral 46 in illustrated in FIGS. 1 and 7). While FIG. 17 only illustrates a few entries, in practice the electronic database 214 of keys may contain hundreds, thousands, or even millions of entries detailing many mortgage documents.

FIG. 18 illustrates database replies. The audit server 50 queries the electronic database 214 of keys for the source key 210 received via the audit file 44. The key server 216 retrieves and packages the corresponding sourcing data 90 as a key response 224. The key server 216 sends the key response 224 to the network address (e.g., IP address) associated with the audit server 50.

Figure 19:
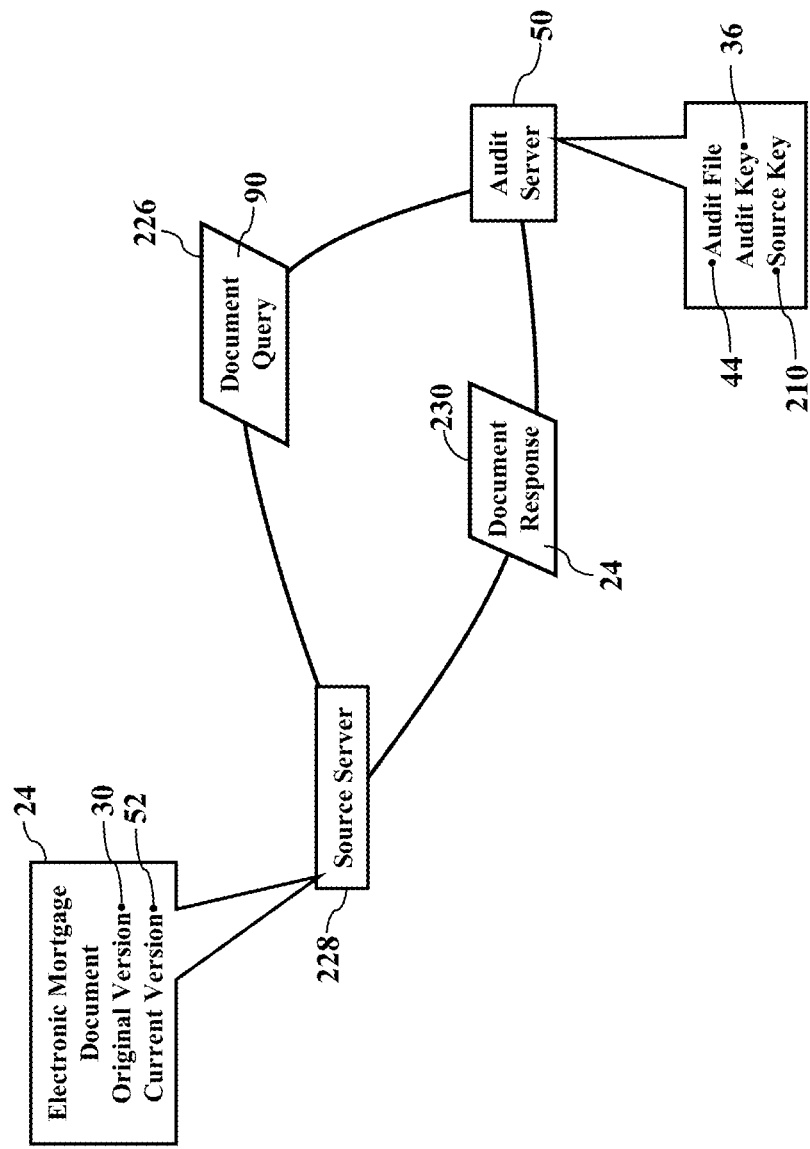
FIG. 19 illustrates document retrieval, according to exemplary embodiments.

FIG. 19 illustrates document retrieval, according to exemplary embodiments. Now that the audit server 50 has determined the sourcing data 90 associated with the source key 210, the audit server 50 may retrieve the corresponding electronic mortgage document 24. The audit server 50 sends a document query 226 specifying the sourcing data 90 to a source server 228. When the source server 228 receives the document query 226, the source server 228 retrieves and sends the corresponding electronic mortgage document 24 as a document response 230. The audit server 50 has thus obtained the electronic mortgage document 24 referenced or associated with the audit file 44.

Exemplary embodiments may thus be used to retrieve different versions of the electronic mortgage document 24. If the audit file 44 references the source key 210 representing the original version 30 of the electronic mortgage document 24, then the audit server 50 need only query the key server 216 to determine the corresponding sourcing data 90 describing the network location associated with the original version 30. Similarly, if the audit file 44 references the source key 210 representing the current version 52 of the electronic mortgage document 24, then the audit server 50 need only query the key server 216 to determine the corresponding sourcing data 90 describing the network location associated with the current version 52. Exemplary embodiments may thus hash any of the metadata 92 and include the resulting hash values in the audit file 44.

Figure 20:
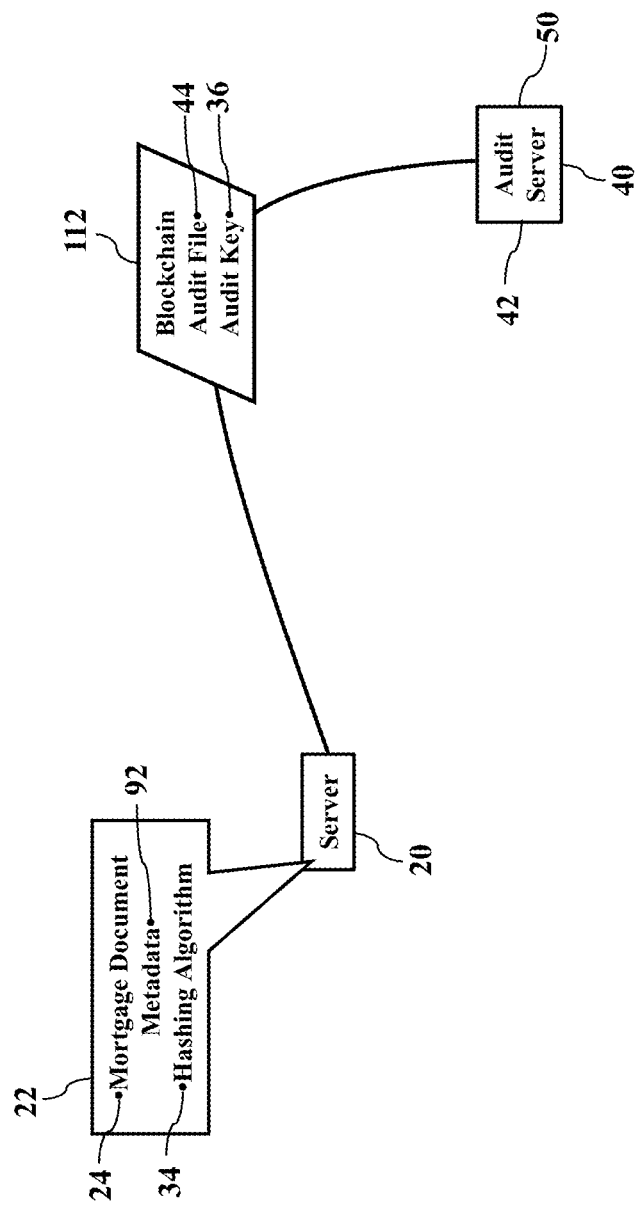
FIG. 20 illustrates publication of the audit file, according to exemplary embodiments.

FIG. 20 illustrates publication of the audit file 44, according to exemplary embodiments. Here exemplary embodiments may distribute the audit file 44 as a record in the blockchain 112. Exemplary embodiments, in other words, may integrate the audit file 44 as a transaction or block of data in the blockchain 112. FIG. 20 illustrates the blockchain 112 being distributed to the audit server 50, but the blockchain 112 may be unicast or broadcast to any one or more peer device. Exemplary embodiments may thus hash the electronic data 22 representing the audit file 44 as a further cryptographic security measure. That is, the cryptographic audit key 36 may represent the hash values generated from hashing some or all of the audit file 44 using the hashing algorithm 34. Exemplary embodiments may integrate the cryptographic audit key 36 (representing the audit file 44) as a historical ledger transaction or block in the blockchain 112.

Figure 21:
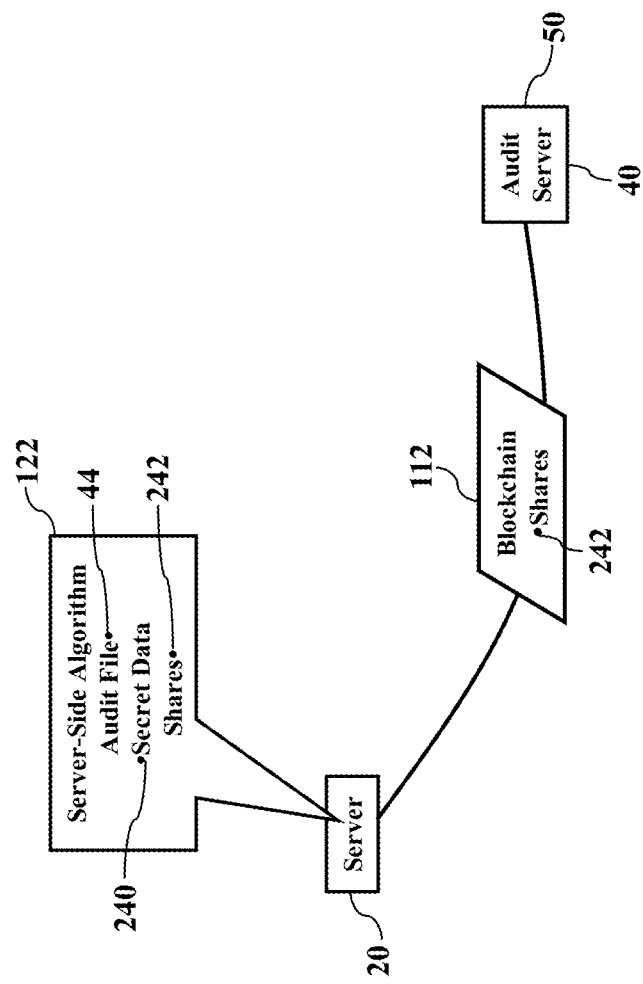
FIGS. 21-22 illustrate secret sharing of the audit file, according to exemplary embodiments.
Figure 22:
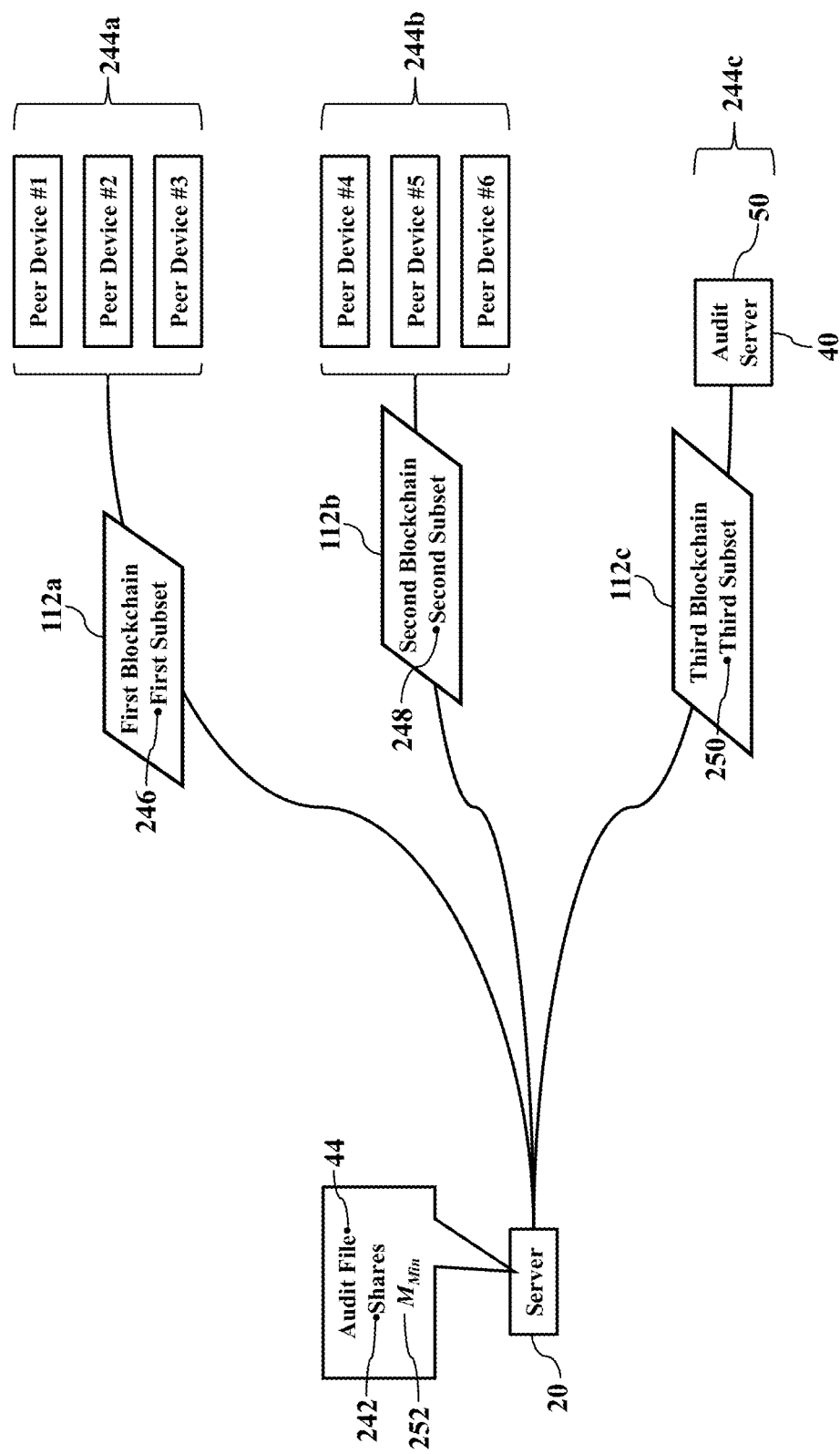

FIGS. 21-22 illustrate secret sharing of the audit file 44, according to exemplary embodiments. By now the reader understands that the audit file 44 may contain sensitive information (such as an applicant's social security number, income, banking, and other personal information). The audit file 44, in plain words, may contain secret data 240. If the audit file 44 was to fall into the wrong hands, the secret data 240 may be nefariously used by a rogue entity.

Exemplary embodiments may thus protect the audit file 44. When the server 20 generates the audit file 44, the server 20 may split the audit file 44 into multiple pieces termed shares 242. The server 20 may then distribute one or more of the shares 242 via the blockchain 112 to the Internet Protocol address associated with the audit server 50.

FIG. 22 further illustrates secret sharing. Here, though, the server 20 may integrate any one or more of the shares 242 into multiple blockchains 112. While exemplary embodiments may utilize any number of different blockchains 112, FIG. 22 illustrates a simple example of three (3) blockchains 112a-c. The blockchains 112a-c may then be distributed to the same destination or to different destinations. FIG. 22, for example, illustrates three (3) different groups 244a-c of destinations, with the audit server 50 being one of the recipients. That is, some of the shares 242 (such as a first subset 246) are integrated into a first blockchain 112a and distributed (via the communications network 46 illustrated in FIGS. 1 and 7) to a first group 244a of peer devices. A second subset 248 of the shares 242 are integrated into a second blockchain 112b and distributed to a second group 244b of peer devices. Still more shares 242 (such as the remaining portion or pieces in a third subset 250) are integrated into a third blockchain 112c and distributed to a third group 244c of peer devices (illustrated as the audit server 50). Different collections of the shares 242, in other words, may be distributed via different blockchains 112 to different destinations/devices.

Exemplary embodiments may thus stash the shares 242 in the multiple blockchains 112a-c. Because the audit file 44 may be split into the multiple shares 242, any one or more recipient peer devices must possess a sufficient minimum number $M_{Min}$ (illustrated as reference numeral 252) of the shares 242 before the audit file 44 may be recovered. That is, possession of an insufficient number of the shares 242 guarantees that the audit file 44 remains unknown and confidential. So, if the first blockchain 112a contains less than the $M_{Min}$ 252 of the total shares 242, then the first group 244a of peer devices cannot reconstruct the audit file 44. Likewise, if the second blockchain 112b and/or the third blockchain 112c also contains less than the $M_{Min}$ 252, the second group 244b of peer devices and the third group 244c of peer devices are also unable to reveal or decipher the audit file 44. In other words, no single one of the multiple blockchains 112a-c stores the requisite minimum number $M_{Min}$ 252 of the shares 242 to launch a brute-force attack on the audit file 44. Even multiple ones of the blockchains 112a-c may be purposefully designed to never exceed the requisite minimum number $M_{Min}$ 252 of the shares 242, perhaps thus forcing a hacker to compromise several or all of the blockchains 112a-c. A rogue attack, in simple words, would have to access and compromise multiple blockchains 112 before jeopardizing the audit file 44.

Exemplary embodiments thus present another elegant solution. The sensitive, secret audit file 44 may be secretly shared via the one or more blockchains 112a-c. Even if the blockchains 112a-c are dispersed to trusted peer devices, the peer devices still cannot discern the audit file 44 until the threshold minimum number $M_{Min}$ 252 of the shares 242 is obtained. Exemplary embodiments thus purposefully add a second-layer of protection, beyond merely trusted receipt of the blockchain 112. The trusted peers simply do not have access to the audit file 44 until the minimum number $M_{Min}$ 252 of the shares 242 is obtained.

Any secret sharing scheme may be utilized. The reader is perhaps familiar with Shamir's Secret Sharing Algorithm, which is a well-known cryptographic algorithm. Exemplary embodiments may thus divide the audit file 44 into unique parts (e.g., the shares 242), with each individual share 242 being different from other shares 242. However, there are many secret sharing or splitting schemes and algorithms for distributing a secret, and exemplary embodiments may be applied regardless of any particular scheme or algorithm.

Figure 23:
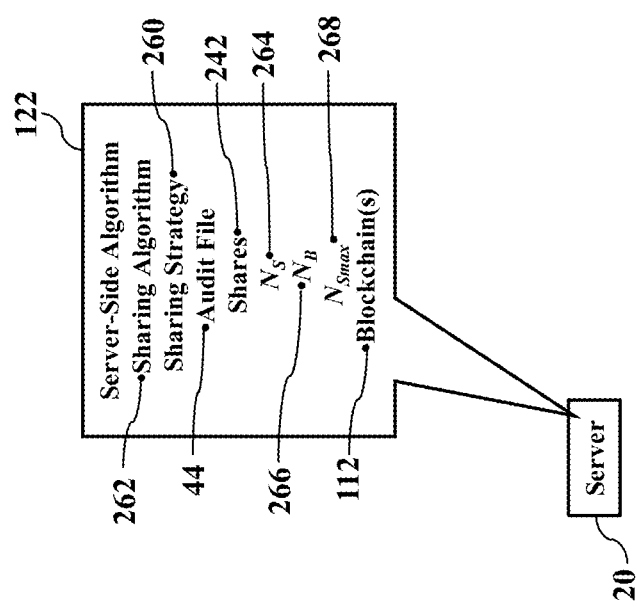
FIGS. 23-24 illustrate a sharing strategy, according to exemplary embodiments.
Figure 24:
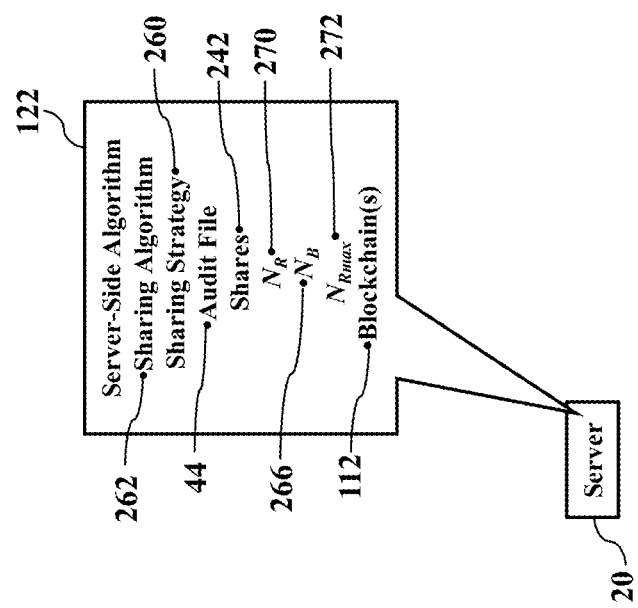

FIGS. 23-24 illustrate a sharing strategy 260, according to exemplary embodiments. Here the server-side algorithm 122 may call a sharing algorithm 262 to retrieve and/or to implement the sharing strategy 260 that defines distribution via the multiple blockchains 112 to protect the audit file 44. Suppose, for example, that the total number $N_S$ (illustrated as reference numeral 264) of the shares 242 defines a number $N_B$ (illustrated as reference numeral 266) of the different blockchains 112. The total number $N_S$ 264 of the shares 242, in other words, may relate by a ratio to the number $N_B$ 266 of blockchains 112 that must be used. As a simple example, the ratio may be $$\frac{N_S}{N_B} = 10,000,$$

where the total number $N_S$ 264 of the shares 242 is ten thousand (10,000) times the number $N_B$ 266 of blockchains 112 that must be used. Again, as a simple example, if the audit file 44 is associated with one million (1,000,000) shares 242, then one hundred (100) different blockchains 112 must be generated and distributed. The sharing strategy 260, in other words, may set a maximum number $N_S$. (illustrated as reference numeral 268) of shares 242 integrated into any single blockchain 112. The sharing strategy 260, in other words, may thus limit the number of the shares 242 exposed by any individual blockchain 112.

FIG. 24 further illustrates the sharing strategy 260. Here, though, the number $N_B$ 266 of blockchains may be based on the number of recipients. That is, the total number $N_R$ (illustrated as reference numeral 270) of the recipients may define the number $N_B$ 266 of the different blockchains 112. The greater the recipients, in other words, then the greater the $N_B$ 266 of blockchains 112 that must be used. Again, suppose that the sharing strategy 260 may again be defined as the ratio $$\frac{N_R}{N_B} = 100,$$

where the total number $N_R$ 270 of the recipients is one hundred (100) times the number $N_B$ 266 of blockchains 112 that must be used. Again, as a simple example, if there are ten thousand recipients, then one hundred (100) different blockchains 112 must be generated and distributed. The sharing strategy 260, in other words, may set a maximum number $N_{Rmax}$ (illustrated as reference numeral 272) of recipients per blockchain 112. The sharing strategy 260, in other words, may thus limit the number of the shares 242 exposed by any individual blockchain 112.

The sharing strategy 260 may be implemented as logical rules. If the sharing strategy 260 is mathematically defined (such as the ratio above discussed), the sharing strategy 260 may be expressed as logical statements involving mathematical expressions. Exemplary embodiments may code or program the sharing strategy 260 to achieve policy goals and/or security objectives.

Figure 25:
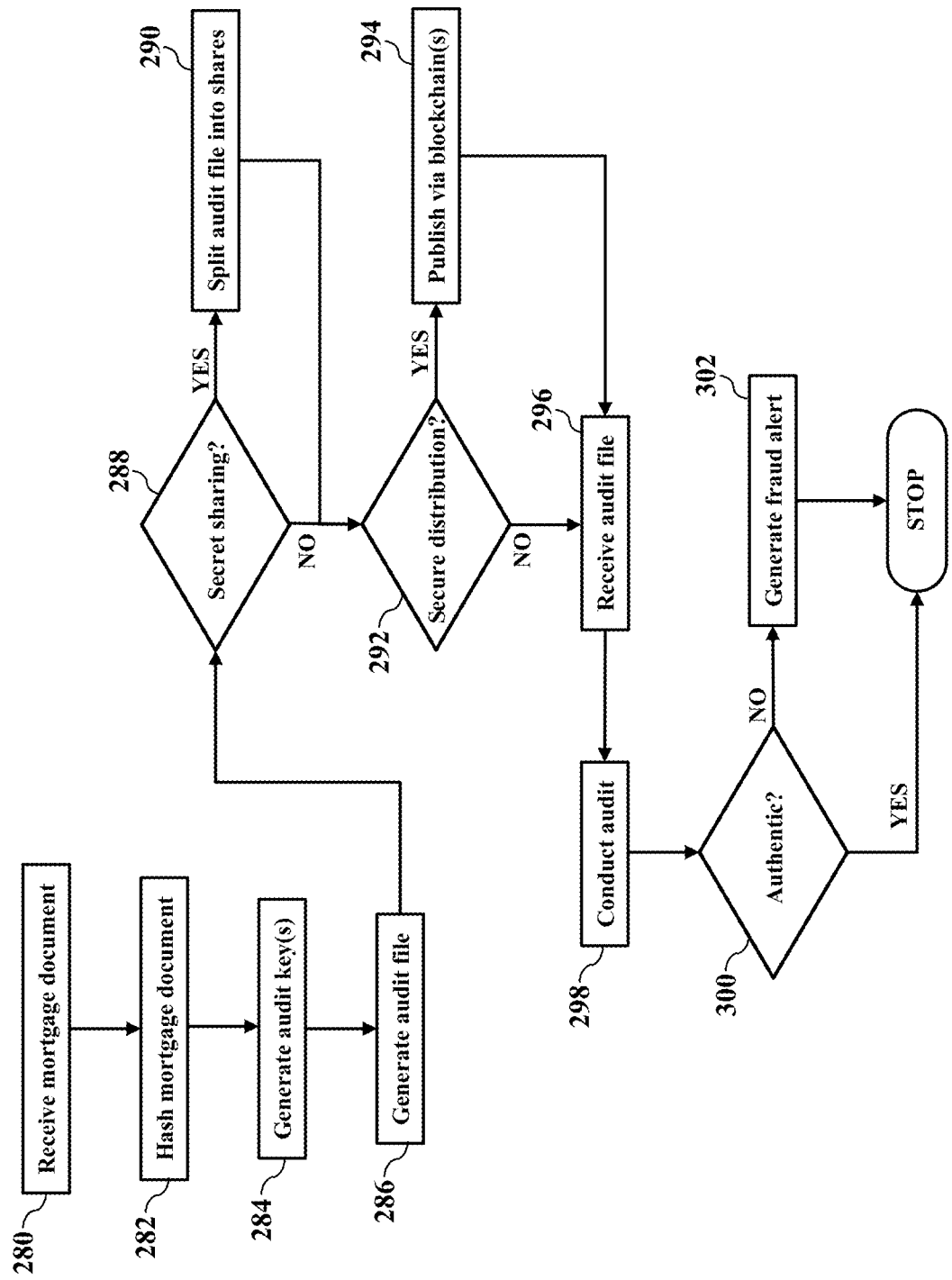
FIG. 25 is a flowchart illustrating a method or algorithm for auditing the mortgage documents, according to exemplary embodiments.

FIG. 25 is a flowchart illustrating a method or algorithm for auditing the electronic mortgage documents 24, according to exemplary embodiments. The electronic data 22 representing the mortgage document 24 is received (Block 280). The electronic data 22 is hashed using the cryptographic hashing algorithm 34 (Block 282) to generate the audit key(s) 36 (Block 284). The audit file 44 is generated (Block 286). If secret sharing is desired (Block 288), then the audit file 44 is split into the shares 242 (Block 290). If secure distribution is desired (Block 292), then the audit file 44 and/or the shares 242 are published via the blockchain(s) 112 (Block 294). The auditor 40 receives the audit file (Block 296) and conducts the audit 42 (as this disclosure explains) (Block 298) to determine whether the mortgage document 24 is authentic 58 or inauthentic 60 (Block 300). If the mortgage document 24 is inauthentic 60, the fraud alert 64 may be generated (Block 302).

Figure 26:
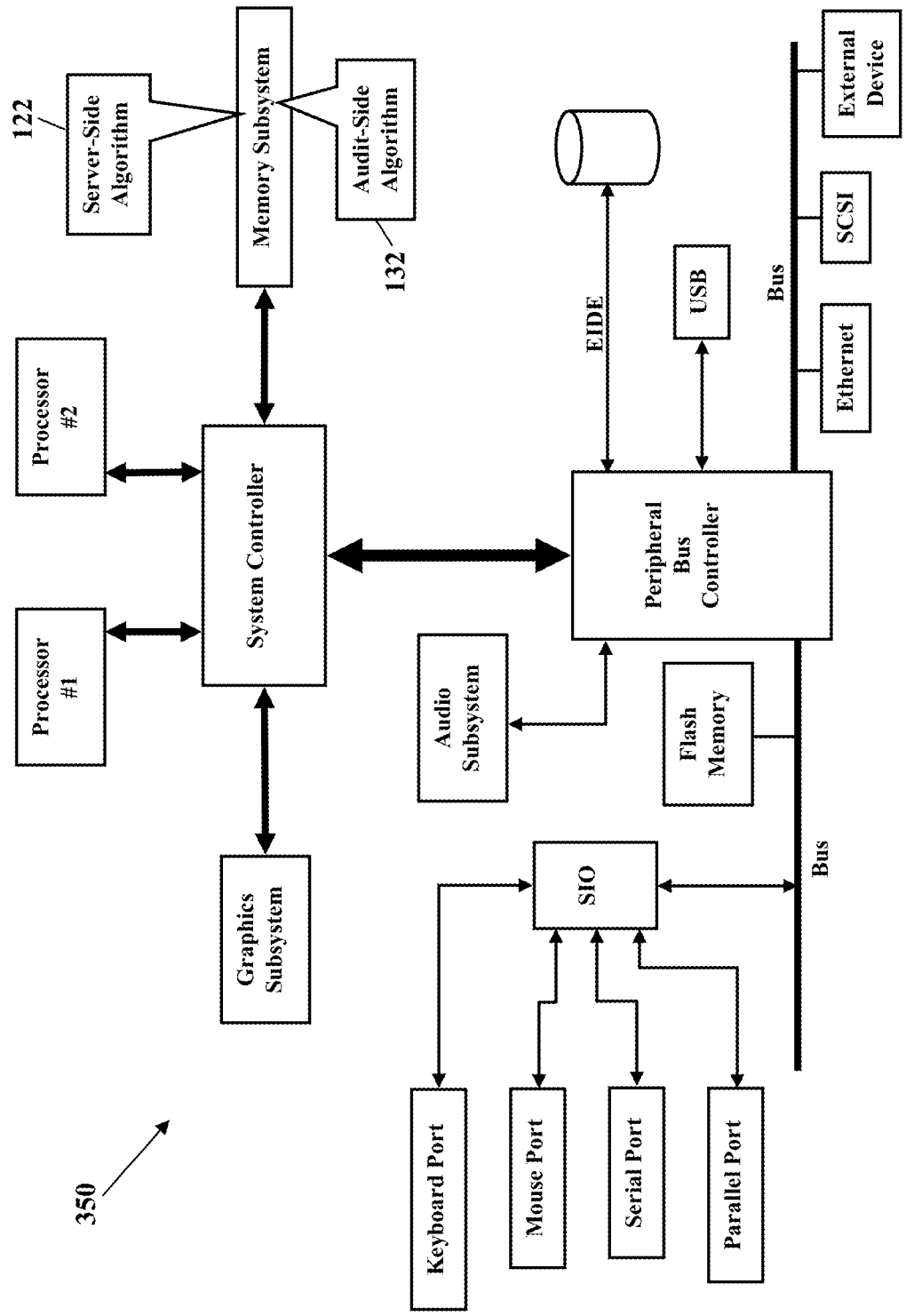
FIGS. 26-27 depict still more operating environments for additional aspects of the exemplary embodiments.

FIG. 26 is a schematic illustrating still more exemplary embodiments. FIG. 26 is a more detailed diagram illustrating a processor-controlled device 350. As earlier paragraphs explained, the server-side algorithm 122 and the audit-side algorithm 132 may partially or entirely operate in any mobile or stationary processor-controlled device. FIG. 26, then, illustrates the server-side algorithm 122 and the audit-side algorithm 132 stored in a memory subsystem of the processor-controlled device 350. One or more processors communicate with the memory subsystem and execute either, some, or all applications. Because the processor-controlled device 350 is well known to those of ordinary skill in the art, no further explanation is needed.

Figure 27:
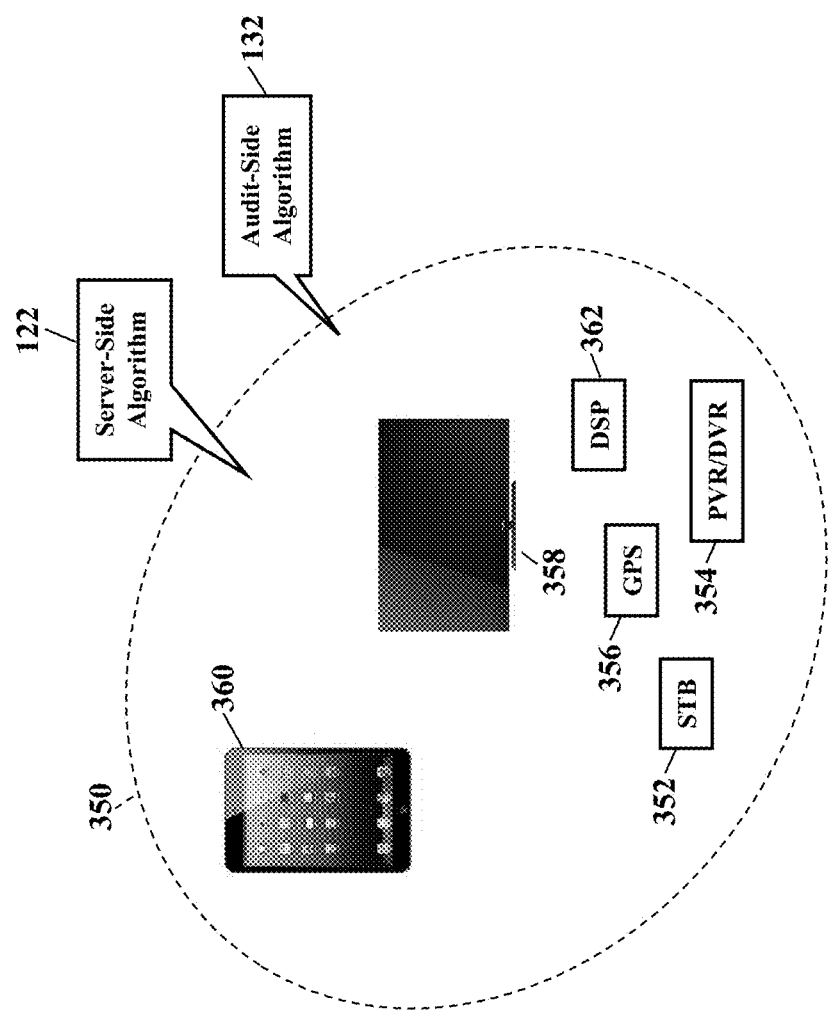

FIG. 27 depicts other possible operating environments for additional aspects of the exemplary embodiments. FIG. 27 illustrates the server-side algorithm 122 and the audit-side algorithm 132 operating within various other processor-controlled devices 350. FIG. 27, for example, illustrates that the server-side algorithm 122 and the audit-side algorithm 132 may entirely or partially operate within a set-top box ("STB") (352), a personal/digital video recorder (PVR/DVR) 354, a Global Positioning System (GPS) device 356, an interactive television 358, a tablet computer 360, or any computer system, communications device, or processor-controlled device utilizing any of the processors above described and/or a digital signal processor (DP/DSP) 362. Moreover, the processor-controlled device 350 may also include wearable devices (such as watches), radios, vehicle electronics, clocks, printers, gateways, mobile/implantable medical devices, and other apparatuses and systems. Because the architecture and operating principles of the various devices 350 are well known, the hardware and software componentry of the various devices 350 are not further shown and described.

Exemplary embodiments may be applied to any signaling standard. Most readers are thought familiar with the Global System for Mobile (GSM) communications signaling standard. Those of ordinary skill in the art, however, also recognize that exemplary embodiments are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard. Exemplary embodiments may also be applied to other standards, such as the I.E.E.E. 802 family of standards, the Industrial, Scientific, and Medical band of the electromagnetic spectrum, BLUETOOTH®, and any other.

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for auditing mortgage documents, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method of auditing an electronic document, comprising:

receiving, by a server, an audit file specifying the electronic document, the audit file comprising (i) a cryptographic audit key representing a first portion of a first version of the electronic document, (ii) an interval of time for auditing the electronic document, and (iii) a sourcing data associated with a second version of the electronic document;

using the sourcing data to obtain, by the server, the second version of the electronic document;

retrieving, by the server, the interval of time specified by the audit file;

generating, by the server, a verification hash value by hashing an electronic data representing a portion of the second version of the electronic document using a cryptographic hashing algorithm, the portion of the second version of the electronic document corresponding to the first portion of the first version of the electronic document;

invoking, by the server, a timer that increments from an initial value to a final value determined by the interval of time;

as the timer increments, comparing, by the server, the verification hash value to the cryptographic audit key; and performing one of (i) in response to art expiration of the interval of time, declining further access to the audit file, (ii) in response to the verification hash value matching the cryptographic audit key prior to the expiration of the interval of time, verifying, by the server, that the second version of the electronic document is authentic, and (iii) in response to the verification hash value failing to match the cryptographic audit key prior to the expiration of the interval of time, determining that the second version of the electronic document is inauthentic.

2. The method of claim 1, further comprising recording an audit result to a blockchain.

3. The method of claim 1, further comprising distributing the verification hash value via a blockchain.

4. The method of claim 1, wherein the first portion of the first version of the electronic document comprises an entirety of the first version of the electronic document.

5. The method of claim 1, further comprising retrieving a metadata associated with the electronic document from the audit file, the metadata comprising at least one of (i) a creation date of the first version of the electronic document, and (ii) an identifier of the first version of the electronic document.

6. The method of claim 5, further comprising generating a digital signature by hashing the metadata retrieved from the audit file.

7. The method of claim 5, wherein the metadata provides a further description of the first version of the electronic document.

8. A system for auditing an electronic document, the system comprising:

a hardware processor; and a memory device storing instructions that, when executed by the hardware processor, perform operations comprising:

receiving an audit file associated with the electronic document, the audit file comprising (i) a cryptographic audit key representing a first portion of a first version of the electronic document, (ii) an interval of time for auditing the electronic document, and (iii) a sourcing data associated with a second version of the electronic document;

retrieving the interval of time specified by the audit file;

using the sourcing data to obtain the second version of the electronic document;

generating a verification hash value by hashing an electronic data representing a portion of the second version of the electronic document using a cryptographic hashing algorithm, the portion of the second version of the electronic document corresponding to the first portion of the first version of the electronic document;

invoking a timer that increments from an initial value to a final value determined by the interval of time for auditing the electronic document;

as the timer increments, comparing the verification hash value to the cryptographic audit key; and performing one of (i) in response to an expiration of the interval of time, declining further access to the audit file, (ii) in response to the verification hash value matching the cryptographic audit key prior to the expiration of the interval of time, determining that the second version of the electronic document is authentic, and (iii) in response to the verification hash value failing to match the cryptographic audit key prior to the expiration of the interval of time, determining that the second version of the electronic document is inauthentic.

9. The system of claim 8, wherein the operations further comprise recording an audit result to a blockchain.

10. The system of claim 8, wherein the operations further comprise distributing the verification hash value via a blockchain.

11. The system of claim 8, wherein the first portion of the first version of the electronic document comprises an entirety of the first version of the electronic document.

12. The system of claim 8, wherein the operations further comprise retrieving a metadata associated with the electronic document from the audit file, the metadata comprising at least one of (i) a creation date of the first version of the electronic document, and (ii) an identifier of the first version of the electronic document.

13. The system of claim 12, wherein the operations further comprise generating a digital signature by hashing only the metadata.

14. The system of claim 12, wherein the metadata provides a further description of the first version of the electronic document.

15. A memory device storing instructions that, when executed by a hardware processor, perform operations comprising:

receiving an audit file associated with an electronic document, the audit file comprising (i) a cryptographic audit key representing a first portion of a first version of the electronic document, (ii) an interval of time for auditing the electronic document, and (iii) a sourcing data associated with a second version of the electronic document;

using the sourcing data to obtain the second version of the electronic document;

generating a verification hash value by hashing an electronic data representing a portion of the second version of the electronic document using a cryptographic hashing algorithm, the portion of the second version of the electronic document corresponding to the first portion of the first version of the electronic document;

retrieving the interval of time specified by the audit file;

initiating a timer that increments from an initial value to a final value determined by the interval of time;

as the timer increments, performing a cryptographic audit by comparing the verification hash value to the cryptographic audit key; and performing one of (i) in response to an expiration of the interval of time, declining further access to the audit file, (ii) in response to the verification hash value matching the cryptographic audit key prior to the expiration of the interval of time, determining that the second version of the electronic document is authentic, and (iii) in response to the verification hash value failing to match the cryptographic audit key prior to the expiration of the interval of time, determining that the second version of the electronic document is inauthentic.

16. The memory device of claim 15, wherein the operations further comprise recording an audit result to a blockchain.

17. The memory device of claim 15, wherein the first portion of the first version of the electronic document comprises an entirety of the first version of the electronic document.

18. The memory device of claim 15, wherein the operations further comprise determining a date of creation associated with the electronic document.

19. The memory device of claim 15, wherein the operations further comprise retrieving a metadata associated with the electronic document from the audit file, the metadata comprising at least one of (i) a creation date of the first version of the electronic document, and (ii) an identifier of the first version of the electronic document.

20. The memory device of claim 19, wherein the metadata provides a further description of the first version of the electronic document.

\* \* \* \* \*